(12) United States Patent
Chen et al.

(10) Patent No.: US 11,310,524 B2
(45) Date of Patent: Apr. 19, 2022

(54) METHOD AND APPARATUS FOR DETERMINING MOTION VECTOR OF AFFINE CODE BLOCK

(71) Applicant: HUAWEI TECHNOLOGIES CO., LTD., Shenzhen (CN)

(72) Inventors: Huanbang Chen, Shenzhen (CN); Haitao Yang, Shenzhen (CN); Shan Gao, Dongguan (CN); Jiantong Zhou, Shenzhen (CN); Shan Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/858,222

(22) Filed: Apr. 24, 2020

(65) Prior Publication Data

US 2020/0252645 A1 Aug. 6, 2020

Related U.S. Application Data

(63) Continuation of application No. PCT/CN2018/111835, filed on Oct. 25, 2018.

(30) Foreign Application Priority Data

Oct. 27, 2017 (CN) .......................... 201711025757.6

(51) Int. Cl.
*H04B 1/66* (2006.01)
*H04N 7/12* (2006.01)
(Continued)

(52) U.S. Cl.
CPC ............. *H04N 19/52* (2014.11); *H04N 19/61* (2014.11); *H04N 19/82* (2014.11)

(58) Field of Classification Search
CPC .. H04N 19/119; H04N 19/139; H04N 19/176; H04N 19/51; H04N 19/513
See application file for complete search history.

(56) References Cited

U.S. PATENT DOCUMENTS 5,512,962 A * 4/1996 Homma ............... H04N 19/523
348/699
2006/0002470 A1 1/2006 Sakurai
(Continued)

FOREIGN PATENT DOCUMENTS

CN 1325220 A 12/2001
CN 1780401 A 5/2006
(Continued)

OTHER PUBLICATIONS

Chen et al. (JVET-G1001—Algorithm description of Joint Exploration Test Model 7 (JEM7), Joint Video Exploration Team (JVET)of ITU-T SG 16 WP 3 and ISO/IEC JTC 1/SC 29/WG 11, 7th Meeting, Jul. 13, 2017-Jul. 21, 2017; Torino, Aug. 19, 2017 (Aug. 19, 2017), pp. i-iv, 1, XP030150980 (Year: 2017).*
(Continued)

*Primary Examiner* — Fabio S Lima
(74) *Attorney, Agent, or Firm* — Hauptman Ham, LLP

(57) ABSTRACT

A method includes obtaining a first motion vector of a motion compensation unit included in an affine code block. The method also includes determining a second motion vector based on the first motion vector, where a precision of the second motion vector matches a motion vector precision of a storage unit corresponding to the motion compensation unit. The method further includes determining a third motion vector based on the second motion vector, where there is a preset correspondence between the third motion vector and the second motion vector, and the third motion vector is used for subsequent encoding/decoding processing.

12 Claims, 12 Drawing Sheets

(51) Int. Cl.
*H04N 11/02* (2006.01)
*H04N 11/04* (2006.01)
*H04N 19/52* (2014.01)
*H04N 19/61* (2014.01)
*H04N 19/82* (2014.01)

(56) References Cited

U.S. PATENT DOCUMENTS

| | | |
|---|---|---|
| 2006/0109904 A1 | 5/2006 | Hamada |
| 2007/0025442 A1* | 2/2007 | Okada ............... H04N 19/63 375/240.03 |
| 2011/0235716 A1* | 9/2011 | Tanaka ............. H04N 19/433 375/240.16 |
| 2017/0094312 A1 | 3/2017 | Sakurai et al. |
| 2018/0139468 A1 | 5/2018 | Lin et al. |
| 2018/0192047 A1 | 7/2018 | Lv et al. |
| 2019/0082191 A1* | 3/2019 | Chuang ............. H04N 19/176 |
| 2019/0089976 A1* | 3/2019 | Huang ............... H04N 19/31 |
| 2019/0149838 A1* | 5/2019 | Zhang ............... H04N 19/105 375/240.16 |
| 2019/0335196 A1 | 10/2019 | Zhang et al. |

FOREIGN PATENT DOCUMENTS

| | | |
|---|---|---|
| CN | 101540902 A | 9/2009 |
| CN | 105163116 A | 12/2015 |
| CN | 106303543 A | 1/2017 |
| CN | 106331722 A | 1/2017 |
| EP | 1158806 A1 | 11/2001 |
| WO | 2015163146 A1 | 10/2015 |
| WO | 2017156705 A1 | 9/2017 |

OTHER PUBLICATIONS

International search report dated Jan. 15, 2019 from corresponding application No. PCT/CN2018/111835.
Office Action dated Dec. 2, 2019 from corresponding application No. CN 201711025757.6.
Chen J et al: "Algorithm description of Joint Exploration Test Model 7 (JEM7)", Joint Video Exploration Team (JVET) of ITU-T SG 16 WP 3 and ISO/IEC JTC 1/SC 29/WG 11, JVET-G1001, 7th Meeting: Torino, IT, Jul. 13-21, 2017, total 48 pages. XP030150980.
Huanbang Chen et al. Harmonization of AFFINE, OBMC and DBF, Joint Video Exploration Team (JVET) of ITU-T SG 16 WP 3 and ISO/IEC JTC 1/SC 29/WG 11, JVET-B0038, 2nd Meeting: San Diego, USA, Feb. 20-26, 2016, total 4 pages. XP030150030.
The extended European search report dated Jul. 14, 2020 from corresponding application No. EP 18871778.9.

* cited by examiner

METHOD AND APPARATUS FOR DETERMINING MOTION VECTOR OF AFFINE CODE BLOCK

CROSS-REFERENCE TO RELATED APPLICATIONS

This application is a continuation of International Application No. PCT/CN2018/111835, filed on Oct. 25, 2018, which claims priority to Chinese Patent Application No. 201711025757.6, filed on Oct. 27, 2017. The disclosures of the aforementioned applications are hereby incorporated by reference in their entireties.

TECHNICAL FIELD

This application relates to the video field, and in particular, to a method and an apparatus for determining a motion vector of an affine code block.

BACKGROUND

To improve transmission efficiency, an original video recorded by a camera is encoded to remove redundant information. There is a correlation between scenes in adjacent frames of the video. Therefore, an image may be divided into several blocks or macro blocks, locations of each block or macro block in the adjacent frames are found out, and a relative offset between spatial locations of the block or the macro block in the adjacent frames is obtained. The obtained relative offset is usually referred to as a motion vector (MV). A process of obtaining the motion vector is referred to as motion estimation (ME). The motion vector is usually stored in a unit of a pixel array with a fixed size, so that a decoder side uses the motion vector for decoding. For example, the fixed size is 4×4, indicating that 16 pixels in the unit have a same motion vector. The pixel array is also referred to as a storage unit.

An encoder side or the decoder side may determine reconstruction information of a to-be-reconstructed image based on the motion vector and a reconstructed image. The foregoing process is referred to as motion compensation (MC). A group of pixels for which motion compensation is performed by using a same motion vector is referred to as a motion compensation unit. To reduce complexity of motion compensation, a motion compensation unit with a size greater than that of a storage unit is often used for motion compensation. For example, the size of the motion compensation unit is sometimes set to 8×8, that is, a same motion vector is used for 64 pixels during motion compensation.

Because the size of the motion compensation unit is different from that of the storage unit, in the foregoing motion compensation method, motion information corresponding to the motion compensation unit and the storage unit is separately calculated. This increases encoding/decoding complexity.

SUMMARY

This application provides a vector storage method. A motion vector of a motion compensation unit is processed based on a relationship between motion vector precision of the motion compensation unit and motion vector precision of a storage unit, and a relationship between a size of the motion compensation unit and a size of the storage unit. In some embodiments, a processed motion vector may be stored as a motion vector of the storage unit, without recalculating a motion vector of the storage unit. This can reduce encoding/decoding complexity.

According to a first aspect, a method for determining a motion vector of an affine code block is provided, including: obtaining a first motion vector, where the first motion vector is a motion vector of a first motion compensation unit included in an affine code block; determining a second motion vector based on the first motion vector, where precision of the second motion vector matches motion vector precision of a storage unit corresponding to the first motion compensation unit; and determining a third motion vector based on the second motion vector, where there is a preset correspondence between the third motion vector and the second motion vector, and the third motion vector is used for subsequent encoding/decoding processing.

In this embodiment, after the first motion vector is obtained, whether precision of the first motion vector matches the motion vector precision of the storage unit is first determined, and the second motion vector whose motion vector precision matches the motion vector precision of the storage unit is determined based on the first motion vector. The obtained second motion vector possibly cannot be directly stored. For example, a size of the first motion compensation unit may be different from that of the storage unit. Therefore, the third motion vector is further determined based on the preset correspondence, and finally, the third motion vector is stored. It can be learned from the foregoing that when storing a motion vector, an encoder side and a decoder side may obtain a motion vector of the storage unit based on the motion vector of the motion compensation unit, without recalculating a motion vector of the storage unit. This reduces encoding/decoding complexity.

Optionally, the preset correspondence is as follows: When a size of the storage unit is less than or equal to that of the first motion compensation unit, a value of the third motion vector is equal to that of the second motion vector; or when a size of the storage unit is greater than that of the first motion compensation unit, a value of the third motion vector is equal to that of the second motion vector, or a value of the third motion vector is equal to an average value of values of a fourth motion vector and the second motion vector. The fourth motion vector is a motion vector of a motion compensation unit, other than the first motion compensation unit, in a plurality of motion compensation units corresponding to the storage unit.

When the size of the storage unit is the same as that of the first motion compensation unit, the second motion vector may be directly stored as the motion vector of the storage unit, that is, the value of the second motion vector is equal to that of the third motion vector. When the size of the storage unit is less than that of the first motion compensation unit, because all pixels in the first motion compensation unit have a same motion vector, the second motion vector may also be stored as the motion vector of the storage unit. When the size of the storage unit is greater than that of the first motion compensation unit, because the storage unit is corresponding to the plurality of motion compensation units and the plurality of motion compensation units may have different motion vectors, the motion vector of the storage unit may be determined by using a plurality of methods. A method is directly storing the second motion vector as the motion vector (that is, the third motion vector) of the storage unit, regardless of other motion compensation units. Another method is calculating an average value of motion vectors of the plurality of motion compensation units corresponding to the storage unit, and then storing a vector corresponding to the average value as the third motion vector. The former method is simpler. The third motion vector obtained in the latter method has a smaller error.

Optionally, the obtaining a first motion vector includes: determining a motion vector of a control point of the affine code block, where the control point is a reference pixel used for predicting a motion vector of the affine code block; and determining the first motion vector based on the motion vector of the control point, where a value of the first motion vector is equal to that of the motion vector of the control point, and the first motion compensation unit includes the control point, or the affine code block does not include the control point and the first motion compensation unit is a motion compensation unit closest to the control point among a plurality of motion compensation units included in the affine code block.

In a process of predicting the motion vector of the code block, a pixel is usually selected as a reference point. The reference point is also referred to as a control point. When the first motion compensation unit includes the control point, or when the first motion compensation unit is a motion compensation unit closest to the control point among the plurality of motion compensation units included in the code block, a motion vector of the control point is determined as the first motion vector, so that prediction can be performed for the to-be-encoded or to-be-decoded code block based on the motion vector of the control point, thereby improving encoding/decoding efficiency.

Optionally, the determining a second motion vector based on the first motion vector includes: when motion vector precision of the first motion compensation unit is the same as that of the storage unit, determining that the value of the second motion vector is equal to that of the first motion vector; or when motion vector precision of the first motion compensation unit is different from that of the storage unit, determining the second motion vector based on the first motion vector, the motion vector precision of the first motion compensation unit, the motion vector precision of the storage unit, and a motion vector precision transformation formula.

When the motion vector precision of the first motion compensation unit is the same as that of the storage unit, the first motion vector may be directly used as the second motion vector for subsequent processing. When the motion vector precision of the first motion compensation unit is different from that of the storage unit, precision transformation is performed for the first motion vector, to obtain a motion vector matching the motion vector precision of the storage unit.

Optionally, that precision of the second motion vector matches motion vector precision of a storage unit corresponding to the first motion compensation unit includes: A length of a unit distance of a coordinate axis in a coordinate system corresponding to the second motion vector is equal to a length of a unit distance of a coordinate axis in a coordinate system corresponding to the storage unit.

Precision of a motion vector means a length (a first length) of a unit distance of a coordinate axis in a coordinate system corresponding to the motion vector. The motion vector precision of the storage unit means the length (a second length) of the unit distance of the coordinate axis in the coordinate system corresponding to the storage unit. That the precision of the motion vector matches the motion vector precision of the storage unit means that the first length is equal to the second length. For example, the second length is a length of ¼ pixels. In this case, the motion vector can be transformed from a coordinate system of the first motion compensation unit into the coordinate system of the storage unit only when the first length is the length of ¼ pixels. For another example, when the second length is a length of ¼ pixels and the first length is a length of ¹⁄₁₆ pixels, the precision of the motion vector does not match the motion vector precision of the storage unit, and the motion vector can be stored only after precision transformation is performed on the motion vector.

Optionally, that the third motion vector is used for subsequent encoding/decoding processing includes: The third motion vector is used for deducing motion information of a code block adjacent to the affine code block, and/or the third motion vector is used for loop filtering, and/or the third motion vector is used for overlapped block motion compensation.

According to a second aspect, a motion vector storage apparatus is provided. The apparatus can implement a function performed by an entity for performing the method in the first aspect. The functions may be implemented by using hardware, or may be implemented by hardware executing corresponding software. The hardware or the software includes one or more units or modules corresponding to the foregoing function.

In a possible design, the apparatus is an encoder side, including an encoder-side prediction module, a transformation and quantization module, an entropy encoding module, an encoding reconstruction module, and an encoder-side filtering module. The encoder-side prediction module is configured to support the apparatus in performing a corresponding function in the method in the first aspect.

In another possible design, the apparatus is a decoder side, including a decoder-side prediction module, an inverse-transformation and dequantization module, an entropy decoding module, a decoding reconstruction module, and a decoder-side filtering module. The decoder-side prediction module is configured to support the apparatus in performing a corresponding function in the method in the first aspect.

According to a third aspect, a network system is provided. The network system includes the encoder side and the decoder side in the second aspect.

According to a fourth aspect, a computer readable storage medium is provided. The computer readable storage medium stores computer program code. When the computer program code is executed by an encoder-side prediction module or a decoder-side prediction module, an encoder side or a decoder side is enabled to perform the method in the first aspect.

According to a fifth aspect, a chip is provided. The chip stores an instruction. When the instruction is run on an encoder side or a decoder side, the chip is enabled to perform the method in the first aspect.

According to a sixth aspect, a computer program product is provided. The computer program product includes computer program code. When the computer program code is run by an encoder-side processing unit or processor or a decoder-side processing unit or processor, an encoder side or a decoder side is enabled to perform the method in the first aspect.

According to a seventh aspect, a motion vector storage method is provided, including: obtaining a first motion vector, where the first motion vector is a motion vector of a first motion compensation unit included in an affine code block; determining a fifth motion vector based on the first motion vector, where there is a preset correspondence between the fifth motion vector and the first motion vector; and determining a sixth motion vector based on the fifth motion vector, where precision of the sixth motion vector matches motion vector precision of a storage unit corresponding to the first motion compensation unit, and the sixth motion vector is used for subsequent encoding/decoding processing.

In this embodiment, after the first motion vector is obtained, the fifth motion vector is first determined based on the preset correspondence, to obtain the fifth motion vector matching a size of the storage unit. Then, whether precision of the fifth motion vector matches the motion vector precision of the storage unit is determined, and the sixth motion vector matching the motion vector precision of the storage unit is determined based on the fifth motion vector. It can be learned from the foregoing that when storing a motion vector, an encoder side and a decoder side may obtain a motion vector of the storage unit based on the motion vector of the motion compensation unit, without recalculating a motion vector of the storage unit. This reduces encoding/decoding complexity.

Optionally, the preset correspondence is as follows: When the size of the storage unit is less than or equal to that of the first motion compensation unit, a value of the fifth motion vector is equal to that of the first motion vector; or when the size of the storage unit is greater than that of the first motion compensation unit, a value of the fifth motion vector is equal to that of the first motion vector, or a value of the fifth motion vector is equal to an average value of values of a seventh motion vector and the first motion vector. The seventh motion vector is a motion vector of a motion compensation unit, other than the first motion compensation unit, in a plurality of motion compensation units corresponding to the storage unit.

When the size of the storage unit is the same as that of the first motion compensation unit, the value of the fifth motion vector may be directly set to the value of the first motion vector. When the size of the storage unit is less than that of the first motion compensation unit, because all pixels in the first motion compensation unit have a same motion vector, the value of the fifth motion vector may also be set to the value of the first motion vector. When the size of the storage unit is greater than that of the first motion compensation unit, because the storage unit is corresponding to the plurality of motion compensation units and the plurality of motion compensation units may have different motion vectors, the motion vector of the storage unit may be determined by using a plurality of methods. A method is directly storing the fifth motion vector as the motion vector (that is, the sixth motion vector) of the storage unit, regardless of other motion compensation units. Another method is calculating an average value of motion vectors of the plurality of motion compensation units corresponding to the storage unit, and then storing a vector corresponding to the average value as the sixth motion vector. The former method is simpler. The sixth motion vector obtained in the latter method has a smaller error.

Optionally, the obtaining a first motion vector includes: determining a motion vector of a control point of the affine code block, where the control point is a reference pixel used for predicting a motion vector of the affine code block; and determining the first motion vector based on the motion vector of the control point, where a value of the first motion vector is equal to that of the motion vector of the control point, and the first motion compensation unit includes the control point, or the affine code block does not include the control point and the first motion compensation unit is a motion compensation unit closest to the control point among a plurality of motion compensation units included in the affine code block.

In a process of predicting the motion vector of the code block, a pixel is usually selected as a reference point. The reference point is also referred to as a control point. When the first motion compensation unit includes the control point, or when the first motion compensation unit is a motion compensation unit closest to the control point among the plurality of motion compensation units included in the code block, a motion vector of the control point is determined as the first motion vector, so that prediction can be performed for the to-be-encoded or to-be-decoded code block based on the motion vector of the control point, thereby improving encoding/decoding efficiency.

Optionally, the determining a sixth motion vector based on the fifth motion vector includes: when motion vector precision of the first motion compensation unit is the same as that of the storage unit, determining that a value of the sixth motion vector is equal to that of the fifth motion vector; or when motion vector precision of the first motion compensation unit is different from that of the storage unit, determining the sixth motion vector based on the fifth motion vector, the motion vector precision of the first motion compensation unit, the motion vector precision of the storage unit, and a motion vector precision transformation formula.

When the motion vector precision of the first motion compensation unit is the same as that of the storage unit, the fifth motion vector may be directly used as the sixth motion vector for subsequent processing. When the motion vector precision of the first motion compensation unit is different from that of the storage unit, precision transformation is performed for the fifth motion vector, to obtain a motion vector matching the motion vector precision of the storage unit.

Optionally, that precision of the sixth motion vector matches motion vector precision of a storage unit corresponding to the first motion compensation unit includes: A length of a unit distance of a coordinate axis in a coordinate system corresponding to the sixth motion vector is equal to a length of a unit distance of a coordinate axis in a coordinate system corresponding to the storage unit.

Precision of a motion vector means a length (a first length) of a unit distance of a coordinate axis in a coordinate system corresponding to the motion vector. The motion vector precision of the storage unit means the length (a second length) of the unit distance of the coordinate axis in the coordinate system corresponding to the storage unit. That the precision of the motion vector matches the motion vector precision of the storage unit means that the first length is equal to the second length. For example, the second length is a length of ¼ pixels. In this case, the motion vector can be transformed from a coordinate system of the first motion compensation unit into the coordinate system of the storage unit only when the first length is the length of ¼ pixels. For another example, when the second length is a length of ¼ pixels and the first length is a length of ¹⁄₁₆ pixels, the precision of the motion vector does not match the motion vector precision of the storage unit, and the motion vector can be stored only after precision transformation is performed on the motion vector.

Optionally, that the sixth motion vector is used for subsequent encoding/decoding processing includes: The sixth motion vector is used for deducing motion information of a code block adjacent to the affine code block, and/or the sixth motion vector is used for loop filtering, and/or the sixth motion vector is used for overlapped block motion compensation.

According to an eighth aspect, a motion vector storage apparatus is provided. The apparatus can implement a function performed by an entity for performing the method in the seventh aspect. The function may be implemented by using hardware, or may be implemented by hardware executing corresponding software. The hardware or the software includes one or more units or modules corresponding to the foregoing function.

In a possible design, the apparatus is an encoder side, including an encoder-side prediction module, a transformation and quantization module, an entropy encoding module, an encoding reconstruction module, and an encoder-side filtering module. The encoder-side prediction module is configured to support the apparatus in performing a corresponding function in the method in the seventh aspect.

In another possible design, the apparatus is a decoder side, including a decoder-side prediction module, an inverse-transformation and dequantization module, an entropy decoding module, a decoding reconstruction module, and a decoder-side filtering module. The decoder-side prediction module is configured to support the apparatus in performing a corresponding function in the method in the seventh aspect.

According to a ninth aspect, a network system is provided. The network system includes the encoder side and the decoder side in the eighth aspect.

According to a tenth aspect, a computer readable storage medium is provided. The computer readable storage medium stores computer program code. When the computer program code is executed by an encoder-side prediction module or a decoder-side prediction module, an encoder side or a decoder side is enabled to perform the method in the seventh aspect.

According to an eleventh aspect, a chip is provided. The chip stores an instruction. When the instruction is run an encoder side or a decoder side, the chip is enabled to perform the method in the seventh aspect.

According to a twelfth aspect, a computer program product is provided. The computer program product includes computer program code. When the computer program code is run by an encoder-side processing unit or processor or a decoder-side processing unit or processor, an encoder side or a decoder side is enabled to perform the method in the seventh aspect.

DESCRIPTION OF EMBODIMENTS

For ease of understanding of this application, possible technical features of technical solutions provided in this application are first described.

Figure 1:
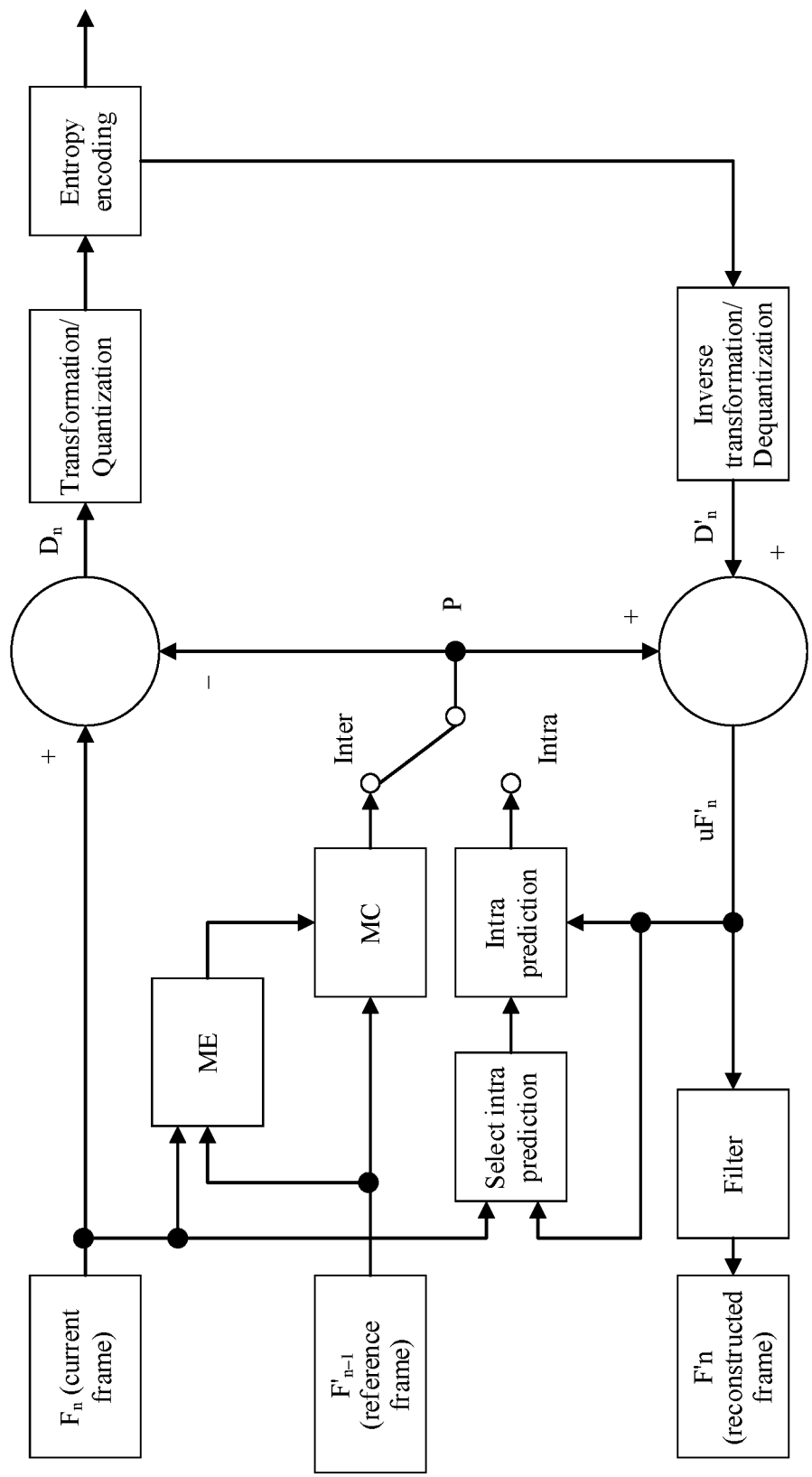
FIG. 1 is a schematic flowchart of a video encoding method, in accordance with one or more embodiments.

FIG. 1 is a schematic flowchart of a video encoding method, in accordance with one or more embodiments.

The video encoding method includes steps such as intra prediction, inter prediction, transformation, quantization, entropy encoding, and in-loop filtering. After an image is divided into code blocks, intra prediction or inter prediction is performed. Then, transformation and quantization are performed after a residual is obtained. Finally, entropy encoding is performed and a code stream is output. The code block herein is an M×N array (where M may be equal to N or may not be equal to N) that includes pixels. In addition, a pixel value of each pixel location is known. In FIG. 1, P indicates a predictor, $D_n$ indicates a residual, $uF_n'$ indicates a reconstruction value (before filtering), and $D_n$ indicates a residual.

Intra prediction means predicting a pixel value of a pixel in a current code block by using a pixel value of a pixel in a reconstructed area in a current image.

The inter prediction means looking for, in a reconstructed image, a matched reference block for a current code block in the current image; using a pixel value of a pixel in the reference block as prediction information or a predictor (information and a value are not distinguished below) of the pixel value of the pixel in the current code block, where this process is motion estimation; and transmitting motion information of the current code block.

It should be noted that the motion information of the current code block includes prediction direction indication information (which is usually forward prediction, backward prediction, or bidirectional prediction), one or two motion vectors pointing to a reference block, and indication information (usually marked as a reference frame index) of an image in which the reference block is located.

The forward prediction means selecting a reference image from a forward reference image set, to obtain a reference block for a current code block. The backward prediction means selecting a reference image from a backward reference image set, to obtain a reference block for the current code block. The bidirectional prediction means selecting at least one reference image from a forward reference image set and a backward reference image set each, to obtain at least one reference block. When the bidirectional prediction method is used, the current code block has two reference blocks. Each reference block uses a motion vector and a reference index for an indication. Then, a predictor of a pixel value of a pixel in the current block is determined based on pixel values of pixels in the two reference blocks.

In a motion estimation process, a plurality of reference blocks is searched in a reference picture for the current code block. Which one or more reference blocks are finally used for prediction is determined through rate-distortion optimization (RDO) or by using another method.

After prediction information is obtained by using the intra prediction method or the inter prediction method, residual information may be obtained based on a pixel value of a pixel in a current code block and corresponding prediction information. For example, the residual information may be obtained by directly subtracting the pixel value of the current code block from a pixel value of a reference block, or the residual information may be obtained in another possible manner. Then, the residual information is transformed by using a method such as discrete cosine transformation (DCT). Then operations such as quantization and entropy encoding are performed on transformed residual information to finally obtain a code stream, so that a decoder side decodes the code stream. During processing of an encoder side, a filtering operation may be further performed on a prediction signal and a reconstruction residual signal to obtain a reconstruction signal, and the reconstruction signal is used as a reference signal for subsequent encoding.

Figure 2:
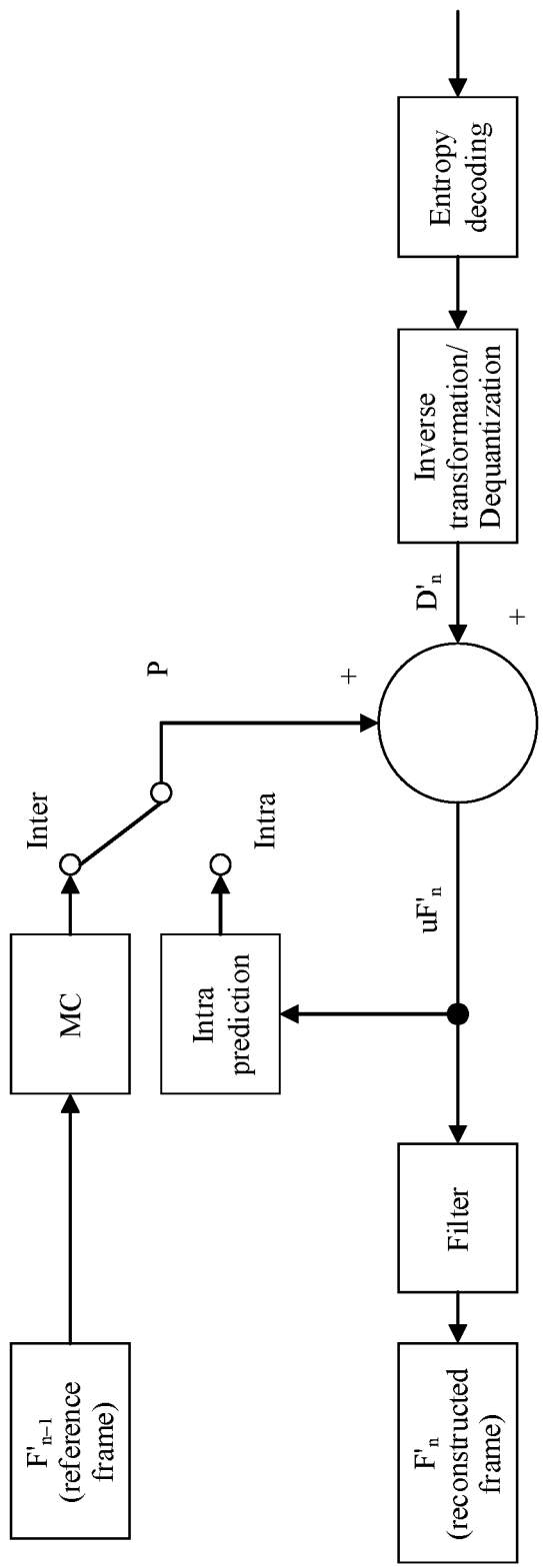
FIG. 2 is a schematic flowchart of a video decoding method, in accordance with one or more embodiments.

Code stream processing performed by the decoder side is similar to an inverse process of image encoding performed by the encoder side. FIG. 2 is a schematic flowchart of a code stream decoding method, in accordance with one or more embodiments.

As shown in FIG. 2, residual information is first obtained through transformation by using operations such as entropy decoding and dequantization. The decoder side first obtains a prediction mode of a current to-be-decoded block by parsing a code stream. In case of intra prediction, prediction information is constructed by using a pixel value of a pixel in a reconstructed area around the current to-be-decoded block. In case of inter prediction, motion information of the current to-be-decoded block is obtained. In addition, a reference block is determined in a reconstructed image by using the motion information, and a pixel value of a pixel in the reference block is used as prediction information. Reconstruction information of the current to-be-decoded block may be obtained by performing a filtering operation by using the prediction information and the residual information, to further obtain a part of the reconstructed image.

In some possible implementations, motion information of a current code block may be obtained through non-translational motion model-based prediction.

In non-translational motion model-based prediction, the encoder side and the decoder side uses one motion model to deduce motion information of each child motion compensation unit in the current block, and performs motion compensation based on the motion information of the child motion compensation unit to obtain a predicted block, thereby improving prediction efficiency. Commonly used motion models include a 6-parameter affine transformation model and a 4-parameter affine transformation model.

The 4-parameter affine transformation model is shown in a formula (1):

$$\begin{cases} vx = a_1 + a_3 x + a_4 y \\ vy = a_2 - a_4 x + a_3 y \end{cases} \quad (1)$$

The 4-parameter affine transformation model may be expressed by using motion vectors of two pixels and coordinates of the motion vectors relative to a pixel of an upper left vertex of the current code block. A pixel used to represent a motion model parameter is denoted as a control point. If pixels in the upper left vertex (0, 0) and an upper right vertex (W, 0) are used as control points, motion vectors $(vx_0, vy_0)$ and $(vx_1, vy_1)$ of the control points in the upper left vertex and the upper right vertex of the current code block are first determined. Then, motion information of each motion compensation sub-unit in the current code block is deduced based on a formula (2). (x, y) are coordinates of a motion compensation sub-unit relative to the pixel in the upper left vertex of the current code block. W is a width of the current code block. The formula (2) is as follows:

$$\begin{cases} vx = \frac{vx_1 - vx_0}{W} x - \frac{vy_1 - vy_0}{W} y + vx_0 \\ vy = \frac{vy_1 - vy_0}{W} x + \frac{vx_1 - vx_0}{W} y + vy_0 \end{cases} \quad (2)$$

The 6-parameter affine transformation model is shown in a formula (3):

$$\begin{cases} vx = a_1 + a_3 x + a_4 y \\ vy = a_2 + a_5 x + a_6 y \end{cases} \quad (3)$$

The 6-parameter affine transformation model may be expressed by using motion vectors of three pixels and coordinates of the motion vectors relative to a pixel of an upper left vertex of the current code block. If pixels in the upper left vertex (0, 0), an upper right vertex (W, 0), and a lower left vertex (0, H) are used as control points, motion vectors $(vx_0, vy_0)$, $(vx_1, vy_1)$, and $(vx_2, vy_2)$ of the control points in the upper left vertex, the upper right vertex, and the lower left vertex of the current code block are first determined. Then, motion information of each motion compensation sub-unit in the current code block is deduced based on a formula (4). (x, y) are coordinates a motion compensation sub-unit relative to the pixel in the upper left vertex of the current code block. W and H are a width and a height of the current code block, respectively. It should be noted that for definitions of the width and the height in this application, reference may be made to a related standard in standards of the image processing field or the video processing field. For example, the width is a quantity of pixels of the current code block in a horizontal direction, and the height is a quantity of pixels of the current code block in a vertical direction.

$$\begin{cases} vx = \frac{vx_1 - vx_0}{W} x + \frac{vx_2 - vy_0}{H} y + vx_0 \\ vy = \frac{vy_1 - vy_0}{W} x + \frac{vy_2 - vx_0}{H} y + vy_0 \end{cases} \quad (4)$$

A code block for which prediction is performed by using an affine transformation motion model is referred to as an affine code block.

Generally, an affine transformation advanced motion vector prediction (AMVP) mode or an affine transformation merging mode may be used to obtain motion information of control points in an affine code block.

The following provides descriptions by using a method for obtaining motion information of two control points in the 4-parameter affine transformation model (the affine transformation advanced motion vector prediction mode) as an example.

(1) Constructing a Candidate Motion Vector 2-Tuple

Figure 3:
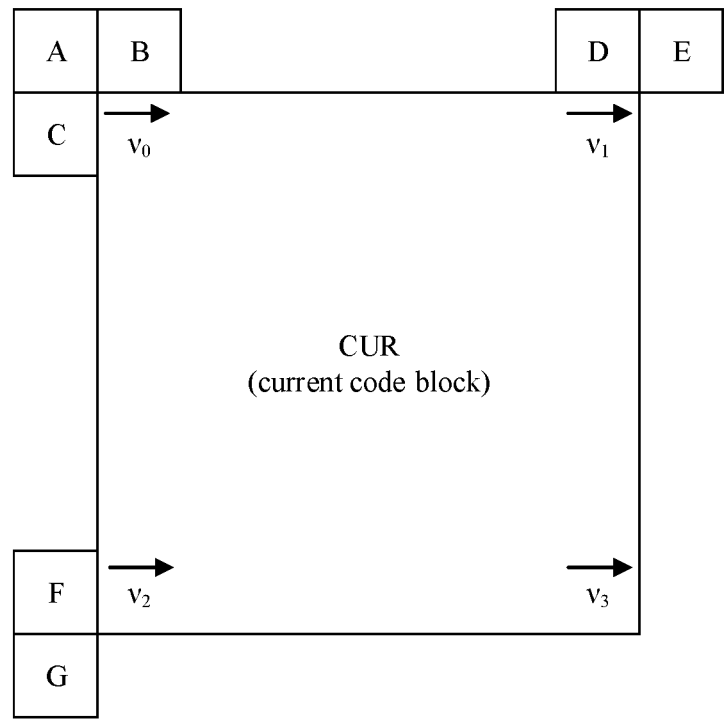
FIG. 3 is a schematic diagram of an affine advanced motion vector prediction mode, in accordance with one or more embodiments.

Motion vectors of the upper left vertex and the upper right vertex of the current code block are determined based on motion information of an encoded block adjacent to the current code block. As shown in FIG. 3, motion vectors of encoded blocks A, B, and C that are adjacent to the upper left vertex are used as candidate motion vectors for the motion vector of the upper left vertex of the current code block, and motion vectors of encoded blocks D and E that are adjacent to the upper right vertex are used as candidate motion vectors for the motion vector of the upper right vertex of the current block. The candidate motion vectors of the upper left vertex and the candidate motion vectors of the upper right vertex are combined to constitute a candidate motion vector 2-tuple queue of the two control points.

$$\{(v_{0A}, v_{1D}), (v_{0A}, v_{1E}), (v_{0B}, v_{1D}), (v_{0B}, v_{1E}), (v_{0C}, v_{1D}), (v_{0C}, v_{1E})\} \quad (5)$$

$v_0$ represents a candidate motion vector of the upper left vertex, and $v_1$ represents a candidate motion vector of the upper right vertex. Positions of the control points in the queue are indexed, where index values are 0, 1, 2, 3, 4, and 5.

Optionally, the candidate motion vector 2-tuple queue is pruned and sorted according to a particular rule, and may be truncated or filled to a particular quantity.

(2) Determining an Optimal Candidate Motion Vector 2-Tuple

On the encoder side, a motion vector of each motion compensation sub-unit (a pixel block, with a size of $N_1 \times N_2$, that is obtained through division based on pixels or by using another method) in the current code block is obtained by using each candidate motion vector 2-tuple and the formula (2). Further, a pixel value of a location, in a reference frame, to which the motion vector of each motion compensation sub-unit points is obtained, and is used as a predictor of a pixel value, and affine transformation motion compensation is performed. An average of differences between original values and predictors that are of pixels in the current code block is calculated, and a motion vector in a candidate motion vector 2-tuple corresponding to a minimum difference average is selected as a predictor of a motion vector of the two control points in the current code block. An index number representing a location of the 2-tuple in the candidate motion vector 2-tuple queue is encoded and added to a code stream, and is sent to a decoder.

On the decoder side, the index number is parsed to obtain the predictor of the motion vector of the two control points.

(3) Determining a Motion Vector of Control Points

On the encoder side, a predictor of a motion vector of two control points is used as a search start point to perform motion search within a specific search range, to obtain the motion vector of the two control points. A difference between the motion vector and the motion vector predictor of the two control points is transmitted to the decoder side.

On the decoder side, a code stream is parsed to obtain a motion vector difference of the two control points, and the motion vectors of the control points are obtained based on the motion vector difference and the motion vector predictors.

The following provides descriptions by using a method for obtaining motion information of the control points in the 6-parameter affine transformation model (the affine transformation merging mode) as an example.

In an affine transformation merging mode, prediction is performed for a current affine code block by using a motion model that is the same as a motion model for an adjacent encoded affine code block.

Figure 4:
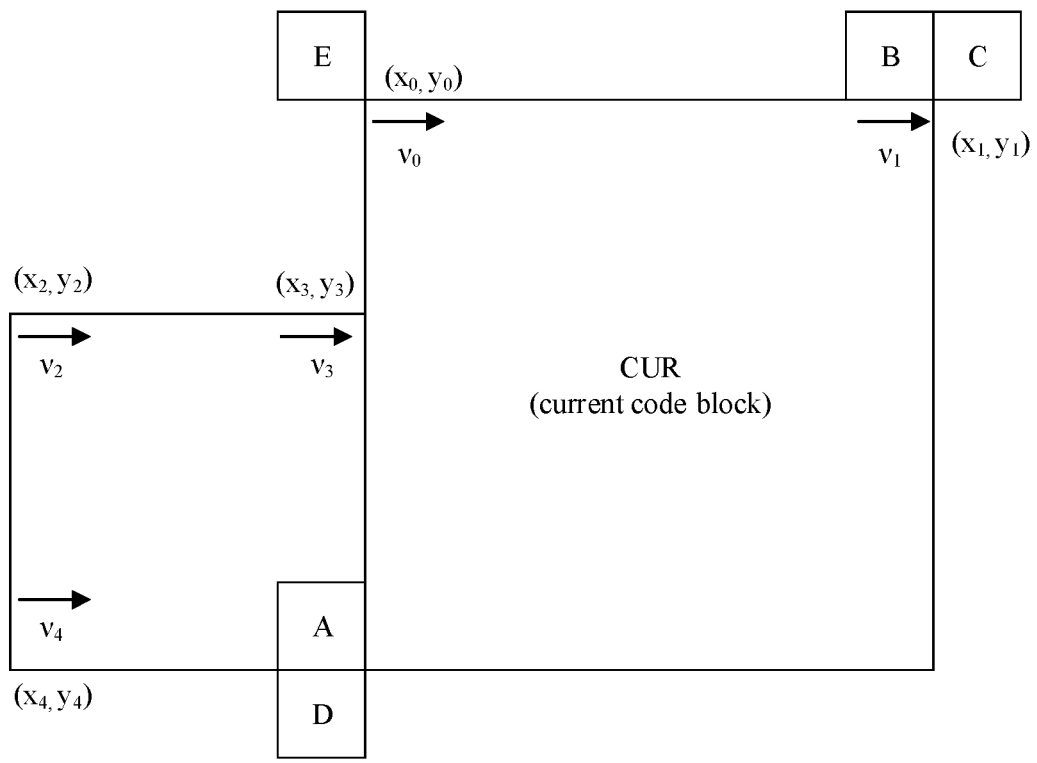
FIG. 4 is a schematic diagram of an affine transformation merging mode, in accordance with one or more embodiments.

As shown in FIG. 4, A, B, C, D, and E are adjacent encoded blocks of a current code block. Traversal is performed according to a sequence of A, B, C, D, and E to find the $1^{st}$ affine code block. Motion information of a control point of the affine code block is obtained. Further, motion information of an upper left vertex and an upper right vertex of the current code block is deduced.

The following describes a deduction process by using A as an example, and another case is similar.

If a code block in which A is located in an affine code block, a motion vector ($vx_2$, $vy_2$) of an upper left vertex ($x_2$, $y_2$) of the affine code block and a motion vector ($vx_3$, $vy_3$) of an upper right vertex ($x_3$, $y_3$) of the affine code block are obtained. A motion vector ($vx_0$, $vy_0$) of an upper left vertex ($x_0$, $y_0$) of a current code block is calculated by using a formula (6). A motion vector ($vx_1$, $vy_1$) of an upper right vertex ($x_1$, $vy_1$) of the current code block is calculated by using a formula (7).

$$\begin{cases} vx_0 = vx_2 + \dfrac{(vx_3 - vx_2)}{x_3 - x_2} \times (x_0 - x_2) - \dfrac{(vy_3 - vy_2)}{x_3 - x_2} \times (y_0 - y_2) \\ vy_0 = vx_2 + \dfrac{(vy_3 - vy_2)}{x_3 - x_2} \times (x_0 - x_2) + \dfrac{(vx_3 - vx_2)}{x_3 - x_2} \times (y_0 - y_2) \end{cases} \quad (6)$$

$$\begin{cases} vx_1 = vx_2 + \dfrac{(vx_3 - vx_2)}{x_3 - x_2} \times (x_1 - x_2) - \dfrac{(vy_3 - vy_2)}{x_3 - x_2} \times (y_1 - y_2) \\ vy_1 = vx_2 + \dfrac{(vy_3 - vy_2)}{x_3 - x_2} \times (x_1 - x_2) + \dfrac{(vx_3 - vx_2)}{x_3 - x_2} \times (y_1 - y_2) \end{cases} \quad (7)$$

It should be noted that another method for obtaining motion information of a control point may also be applied to this application. For brevity, details are not described herein.

For ease of encoding/decoding of a subsequent code block based on motion information of a current code block, the motion information of the current code block is stored. The following describes in detail the technical solutions provided in this application by using an example of determining a motion vector of an affine code block.

Figure 5:
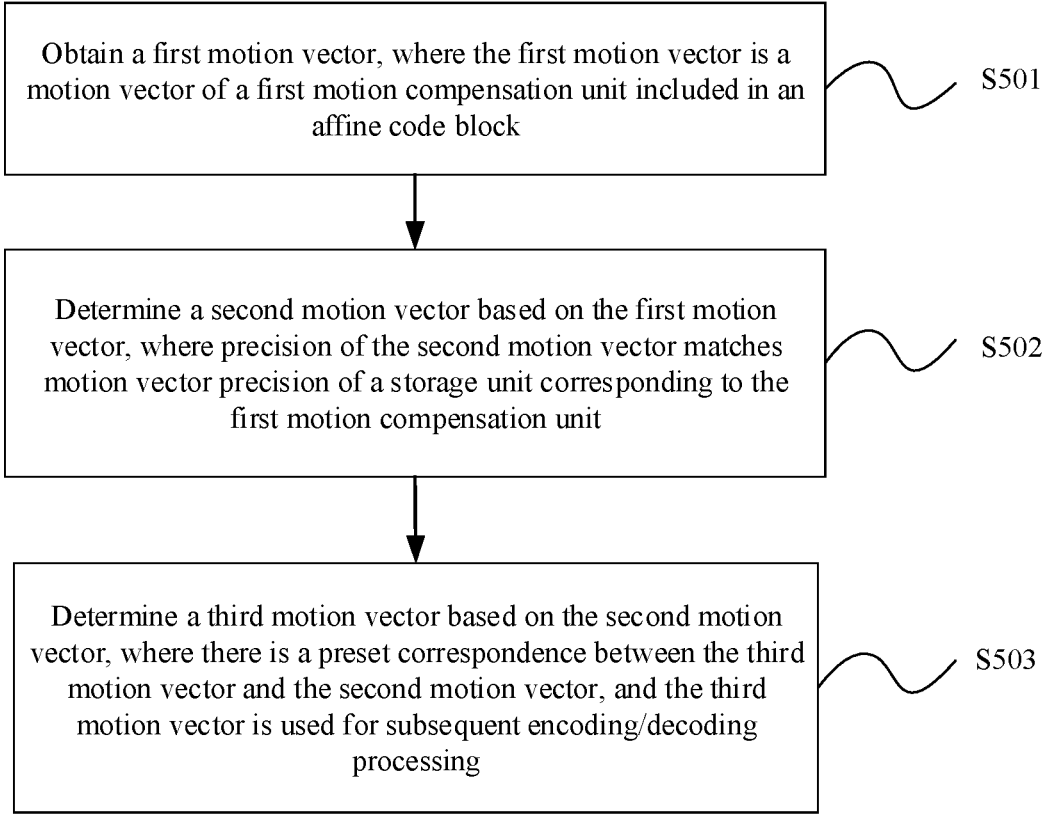
FIG. 5 is a schematic flowchart of a motion vector storage method, in accordance with one or more embodiments.

FIG. 5 is a schematic flowchart of a method for a motion vector storage method, in accordance with one or more embodiments. As shown in FIG. 5, the method 500 includes the following steps.

S501. Obtain a first motion vector, where the first motion vector is a motion vector of a first motion compensation unit included in an affine code block.

S502. Determine a second motion vector based on the first motion vector, where precision of the second motion vector matches motion vector precision of a storage unit corresponding to the first motion compensation unit.

S503. Determine a third motion vector based on the second motion vector, where there is a preset correspondence between the third motion vector and the second motion vector, and the third motion vector is used for subsequent encoding/decoding processing.

The method 500 may be performed by an encoder side or a decoder side. The encoder side or the decoder side may be a hardware device, or may be encoding software or decoding software that runs on a general purpose hardware device, or may be a combination of a hardware device with an encoding/decoding function and encoding/decoding software.

A manner of obtaining the first motion vector by the encoder side or the decoder side is not limited in this application. For example, the first motion vector may be obtained by using the foregoing 4-parameter affine transformation model or 6-parameter affine transformation model, or the first motion vector may be obtained in another manner.

In an optional example, after the first motion vector is obtained, whether precision of the first motion vector matches the motion vector precision of the storage unit is first determined, and the second motion vector matching the motion vector precision of the storage unit is determined. Then, the third motion vector is determined based on the preset correspondence.

In another optional example, after the first motion vector is obtained, a fifth motion vector is first determined based on a preset correspondence. Then, whether precision of the fifth motion vector matches the motion vector precision of the storage unit is determined, and a sixth motion vector matching the motion vector precision of the storage unit is determined.

It should be noted that the preset correspondence is merely used for adjusting a value of a motion vector but not for transforming precision of the motion vector. Regardless of whether the precision of the first motion vector or a value of the first motion vector is adjusted first, a final result is the same, that is, the third motion vector is equivalent to the sixth motion vector. For brevity, the following provides descriptions by using an example in which the precision of the first motion vector is adjusted first and then a precision-adjusted first motion vector (that is, the second motion vector) is processed based on a preset correspondence.

In this application, the motion vector precision of the storage unit indicates a precision requirement of the encoder side or the decoder side for a to-be-stored motion vector. For example, that the motion vector precision of the storage unit is ¼ means that precision of a motion vector of a pixel in the storage unit is ¼ pixels so that the motion vector can be stored in a memory.

That the third motion vector is used for subsequent encoding/decoding processing means that the third motion vector is used for deduction of motion information of a code block adjacent to the affine code block, and/or loop filtering, and/or overlapped block motion compensation. Therefore, for ease of subsequent processing, the third motion vector is stored.

To sum up, in this embodiment, after the first motion vector is obtained, whether the precision of the first motion vector matches the motion vector precision of the storage unit is first determined, and the second motion vector whose motion vector precision matches the motion vector precision of the storage unit is determined based on the first motion vector. The obtained second motion vector possibly cannot be directly stored. For example, a size of the first motion compensation unit may be different from that of the storage unit. Therefore, the third motion vector is further determined based on the preset correspondence, and finally, the third motion vector is stored. It can be learned from the foregoing that when storing a motion vector, the encoder side and the decoder side may obtain a motion vector of the storage unit based on the motion vector of the motion compensation unit, without recalculating a motion vector of the storage unit. This reduces encoding/decoding complexity.

Optionally, the preset correspondence is as follows:

when the size of the storage unit is less than or equal to that of the first motion compensation unit, a value of the third motion vector is equal to that of the second motion vector; or when the size of the storage unit is greater than that of the first motion compensation unit, a value of the third motion vector is equal to that of the second motion vector, or a value of the third motion vector is equal to an average value of values of a fourth motion vector and the second motion vector, where the fourth motion vector is a motion vector of a motion compensation unit, other than the first motion compensation unit, in a plurality of motion compensation units corresponding to the storage unit.

When the size of the storage unit is the same as that of the first motion compensation unit, the second motion vector may be directly stored as the motion vector of the storage unit, that is, the value of the second motion vector is equal to that of the third motion vector. When the size of the storage unit is less than that of the first motion compensation unit, because all pixels in the first motion compensation unit have a same motion vector, the second motion vector may also be stored as the motion vector of the storage unit. When the size of the storage unit is greater than that of the first motion compensation unit, because the storage unit is corresponding to the plurality of motion compensation units and the plurality of motion compensation units may have different motion vectors, the motion vector of the storage unit may be determined by using a plurality of methods. A method is directly storing the second motion vector as the motion vector of the storage unit, regardless of other motion compensation units. Another method is calculating an average value of motion vectors of the plurality of motion compensation units corresponding to the storage unit, and then storing a vector corresponding to the average value as the third motion vector. The former method is simpler. The third motion vector obtained in the latter method has a smaller error.

Optionally, the obtaining a first motion vector includes the following steps.

S504. Determine a motion vector of a control point of the affine code block, where the control point is a reference pixel used for predicting a motion vector of the affine code block.

S505. Determine the first motion vector based on the motion vector of the control point, where the value of the first motion vector is equal to that of the motion vector of the control point, and the first motion compensation unit includes the control point, or the affine code block does not include the control point and the first motion compensation unit is a motion compensation unit closest to the control point among a plurality of motion compensation units included in the affine code block.

In a process of predicting the motion vector of the affine code block, a pixel is usually selected as a reference point. The reference point is also referred to as a control point. When the first motion compensation unit includes the control point, or when the first motion compensation unit is a motion compensation unit closest to the control point among the plurality of motion compensation units included in the affine code block, the motion vector of the control point is determined as the first motion vector, so that encoding/decoding processing can be performed for the code block adjacent to the affine code block based on the motion vector of the control point, thereby improving encoding/decoding efficiency.

Optionally, the determining a second motion vector based on the first motion vector includes the following steps.

S507. When motion vector precision of the first motion compensation unit is the same as that of the storage unit, determine that the value of the second motion vector is equal to that of the first motion vector.

S508. When motion vector precision of the first motion compensation unit is different from that of the storage unit, determine the second motion vector based on the first motion vector, the motion vector precision of the first motion compensation unit, the motion vector precision of the storage unit, and a motion vector precision transformation formula.

When the motion vector precision of the first motion compensation unit is the same as that of the storage unit, the first motion vector may be directly used as the second motion vector for subsequent processing. When the motion vector precision of the first motion compensation unit is different from that of the storage unit, precision transformation is performed for the first motion vector, to obtain a motion vector matching the motion vector precision of the storage unit.

Optionally, that precision of the second motion vector matches motion vector precision of a storage unit corresponding to the first motion compensation unit includes:

a length of a unit distance of a coordinate axis in a coordinate system corresponding to the second motion vector is equal to a length of a unit distance of a coordinate axis in a coordinate system corresponding to the storage unit.

Precision of a motion vector means a length (a first length) of a unit distance of a coordinate axis in a coordinate system corresponding to the motion vector. The motion vector precision of the storage unit means the length (a second length) of the unit distance of the coordinate axis in the coordinate system corresponding to the storage unit. That the precision of the motion vector matches the motion vector precision of the storage unit means that the first length is equal to the second length. For example, the second length is a length of ¼ pixels. In this case, the motion vector can be transformed from a coordinate system of the first motion compensation unit into the coordinate system of the storage unit only when the first length is the length of ¼ pixels. For another example, when the second length is a length of ¼ pixels and the first length is a length of ¹⁄₁₆ pixels, the precision of the motion vector does not match the motion vector precision of the storage unit, and the motion vector can be stored only after precision transformation is performed on the motion vector.

The following further describes the foregoing precision matching by using another example.

The motion vector precision of the first motion compensation unit is 1/M, and a value of M is, for example, 16. In this case, 1/M indicates that a length of a unit distance by which a motion vector horizontally or vertically moves in a plane rectangular coordinate system of the first motion compensation unit is a length of ¹⁄₁₆ pixels. If the first motion vector is (3, 7), the first motion vector indicates that a pixel in the first motion compensation unit horizontally moves by a distance of ³⁄₁₆ pixels and vertically moves by a distance of ⁷⁄₁₆ pixels. Because the first motion vector is a motion vector calculated based on the size and the precision of the first motion compensation unit, the motion vector precision of the first motion compensation unit is equivalent to the precision of the first motion vector.

Assuming that the motion vector precision of the storage unit corresponding to the first motion compensation unit is 1/N and a value of N is, for example, 4, 1/N indicates that a length of a unit distance by which a motion vector horizontally or vertically moves in a plane rectangular coordinate system of the storage unit is a length of ¼ pixels. The motion vector precision of the storage unit is different from that of the first motion compensation unit. The first motion vector can be stored as a motion vector of the storage unit only after the precision of the first motion vector is transformed from ¹⁄₁₆ into ¼.

The precision of the first motion vector may be transformed by using the following formulas:

$$\text{shift} = \log_2(M) - \log_2(N) \quad \text{offset} = (\text{shift} - 1) << 1 \quad (8)$$
$$x' = (x + \text{offset}) >> \text{shift} \quad y' = (y + \text{offset}) >> \text{shift} \quad (9)$$

where "shift" indicates a motion vector precision difference, "offset" is used for round-off, "<<" indicates that a binary number moves leftwards, ">>" indicates that a binary number moves rightwards, x' indicates a horizontal coordinate value of the second motion vector obtained through precision transformation, and y' indicates a vertical coordinate value of the second motion vector obtained through precision transformation.

The first motion vector (3, 7) is substituted into the formula (8) and the formula (9) to obtain the second motion vector (1, 2) through precision transformation. The second motion vector indicates that a pixel in the storage unit horizontally moves by a distance of ¼ pixels and vertically moves by a distance of 2/4 pixels. It can be learned that in the foregoing method, a motion vector of a motion compensation unit can be stored through precision transformation with a cost of slightly increasing an error of the motion vector, without recalculating a motion vector of the storage unit based on motion information of a control point. This improves encoding/decoding efficiency.

It should be understood that the foregoing precision transformation method is merely an example for description, and a precision transformation method applicable to this application is not limited thereto.

The foregoing focuses on the motion vector storage method provided in this application. The following describes in detail a code block prediction process, to help readers understand this application more comprehensively.

Figure 6:
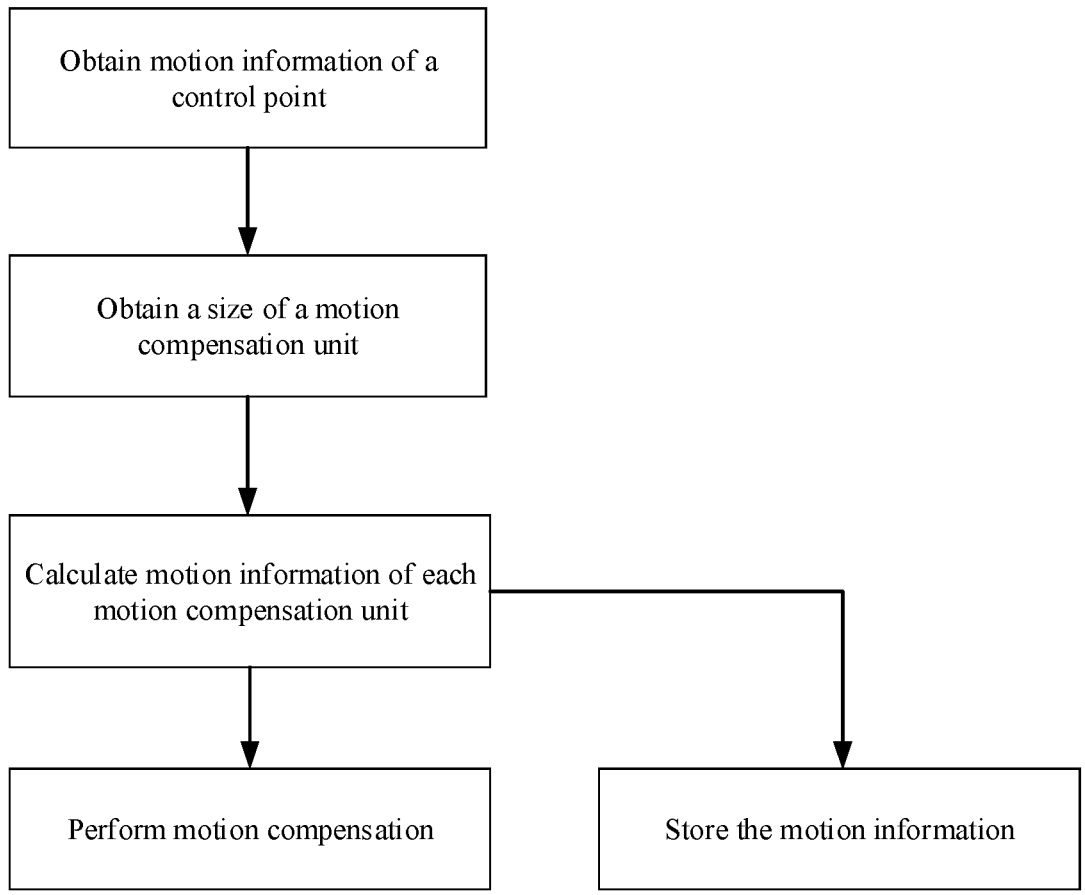
FIG. 6 is a schematic flowchart of a code block prediction method, in accordance with one or more embodiments.

FIG. 6 is a schematic flowchart of a code block prediction method, in accordance with one or more embodiments. The method 600 includes the following steps.

S601. Obtain motion information of a control point of a current affine code block.

An encoder side or a decoder side may obtain the motion information of the control point of the current affine code block based on the foregoing 4-parameter affine transformation model or 6-parameter affine transformation model, or may obtain the motion information of the control point of the current affine code block in another manner. The motion information may include a motion vector of a motion compensation sub-unit in the code block, or may include a motion vector of an image sub-block.

S602. Obtain a size of a motion compensation unit.

The size M×N of the motion compensation unit of the current affine code block may be a size pre-determined by the encoder side or the decoder side. For example, the size may be fixedly set to 4×4 or 8×8, or may be determined based on a motion vector difference between control points, motion vector precision, and a distance between control points.

It should be noted that the size of the motion compensation unit of the affine code block may be determined by using another method. For a specific method, refer to the prior art. Details are not described in this application.

S603. Calculate motion information of each motion compensation unit.

In this step, the motion information of each motion compensation unit in the current affine code block is determined based on the motion information of the control point by using an affine transformation model.

For each motion compensation unit of the current affine code block, motion information (for example, a motion vector) of a pixel at a preset location in the motion compensation unit may be used to represent motion information of all pixels in the motion compensation unit. Assuming that the size of the motion compensation unit is M×N, the pixel at the preset location may be a pixel in a center point (M/2, N/2), an upper left vertex (0, 0), or an upper right vertex (M−1, 0) of the motion compensation unit, or a pixel at another location. A coordinate system of the foregoing coordinates is a plane rectangular coordinate system in which the upper left vertex is an origin, a horizontal direction is an x-axis, and a vertical direction is a y-axis. The following uses a central point of a motion compensation unit as an example for description.

Coordinates of the center point of the motion compensation unit relative to the pixel in the upper left vertex of the current affine code block are calculated by using a formula (10), where i is the $i^{th}$ motion compensation unit (from left to right) in the horizontal direction, j is the $i^{th}$ motion compensation unit (from top to bottom) in the vertical direction, and $(x_{(i,j)}, y_{(i,j)})$ indicates coordinates of a center point of the (i, j)$^{th}$ motion compensation unit relative to the pixel in the upper left vertex of the current affine code block. Then, $(x_{(i,j)}, y_{(i,j)})$ is substituted into a formula (4) to obtain motion information of a center point of each motion compensation unit, and the motion information is used as motion information $(vx_{(i,j)}, vy_{(i,j)})$ of all pixels in the motion compensation unit.

$$\begin{cases} x_{(i,j)} = M \times i + \dfrac{M}{2}, i = 0, 1 \ldots \\ y_{(i,j)} = N \times j + \dfrac{N}{2}, j = 0, 1 \ldots \end{cases} \quad (10)$$

Optionally, precision of a motion vector directly calculated by using the formula (4) is higher than precision of a motion vector of the control point, and may be further quantized to obtain precision that is the same as the precision of the motion vector of the control point.

Figure 7:
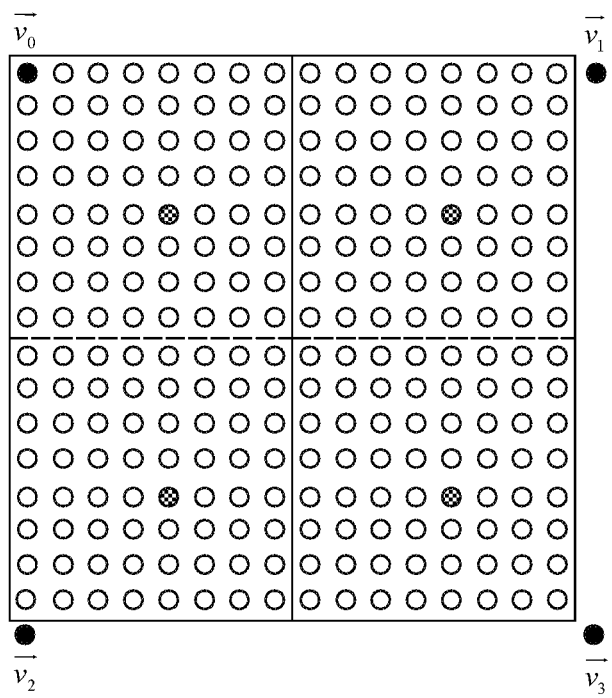
FIG. 7 is a schematic diagram of an affine code block, in accordance with one or more embodiments.

As shown in FIG. 7, in an affine code block with a size of 16×16, a motion compensation unit is 8×8 in size, and a storage unit is also 8×8 in size and overlaps the motion compensation unit. A black solid point is a control point, and a point filled with a slash pattern is a center point of each 8×8 motion compensation unit. Motion information of the center point of each motion compensation unit is set as motion information of the motion compensation unit. Motion information of the control point may be separately stored.

Figure 8:
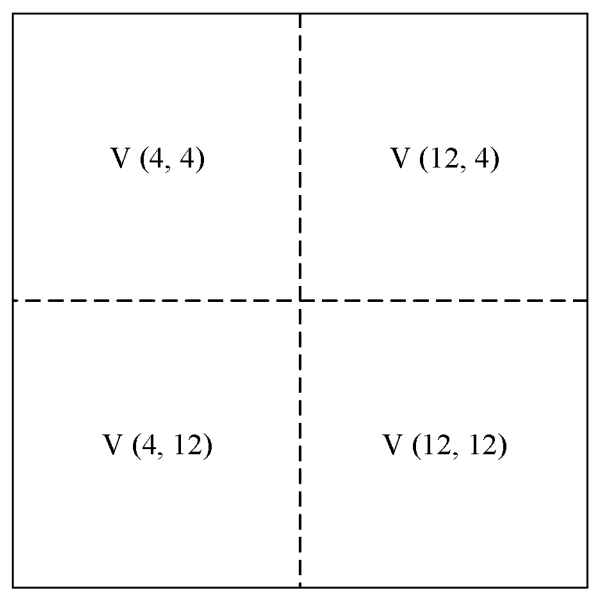
FIG. 8 is a schematic diagram of a motion vector field obtained by using a code block prediction method, in accordance with one or more embodiments.

FIG. 8 shows a motion vector field obtained by using the code block prediction method, in accordance with one or more embodiments. In FIG. 8, V (x, y) indicates a motion vector of a pixel in coordinates (x, y). For example, V (4, 4) indicates a motion vector of a pixel in coordinates (4, 4), V (4, 12) indicates a motion vector of a pixel in coordinates (4, 12), V (12, 4) indicates a motion vector of a pixel in coordinates (12, 4), and V (12, 12) indicates a motion vector of a pixel in coordinates (12, 12). Because a size and precision of a motion compensation unit are the same as those of a storage unit, a motion vector field of a motion compensation unit shown in FIG. 8 is a motion vector field of a storage unit.

S604. Perform motion compensation.

For each motion compensation unit of the current affine code block, motion compensation prediction is performed by using the motion information obtained in step S603, to obtain a predictor of each motion compensation unit. Further, a prediction block of the current affine code block is obtained.

S605. Store the motion information.

It should be understood that the foregoing code block is a to-be-encoded block on the encoder side, and the foregoing code block is a to-be-decoded block on the decoder side.

In a subsequent encoding/decoding process, for example, deblocking filtering, overlapped block motion compensation, and deduction of motion information of a subsequent code block, the motion information of the current affine code block is used. Therefore, the motion information of the motion compensation unit obtained in S603 is stored.

When motion vector precision of the motion compensation unit is the same as that of a storage unit, there are three cases as follows:

If the size of the motion compensation unit is the same as that of the storage unit, the motion information (for example, motion information A) of the corresponding motion compensation unit is directly set as motion information of the storage unit.

If the size of the motion compensation unit is greater than that of the storage unit, motion information of each storage unit in the motion compensation unit is set as first motion information. For example, the size of the motion compensation unit is 8×8, and the size of the storage unit is 4×4. In this case, each motion compensation unit includes four storage units, and motion information A is set as motion information of the storage units.

If the size of the motion compensation unit is less than that of the storage unit, motion information of one of a plurality of motion compensation units corresponding to the storage unit may be set as motion information of the storage unit, or motion information of the storage unit may be set to an average value of all motion information of a plurality of motion compensation units corresponding to the storage unit.

When motion vector precision of the motion compensation unit is different from that of a storage unit, one of the following operations may be performed:

Motion information calculated based on the motion vector precision of the motion compensation unit may be first transformed into motion information matching the motion vector precision of the storage unit, and then motion information of the storage unit is determined by using the foregoing method. Alternatively, motion information (for example, motion information B) of the storage unit may be first determined by using the foregoing method, and then the motion information B is transformed into motion information matching the motion vector precision of the storage unit, for storage.

It should be noted that an execution sequence of S605 and S604 may be changed, that is, after the calculated motion information of the motion compensation unit is stored, motion compensation is performed based on the stored motion information.

Figure 9:
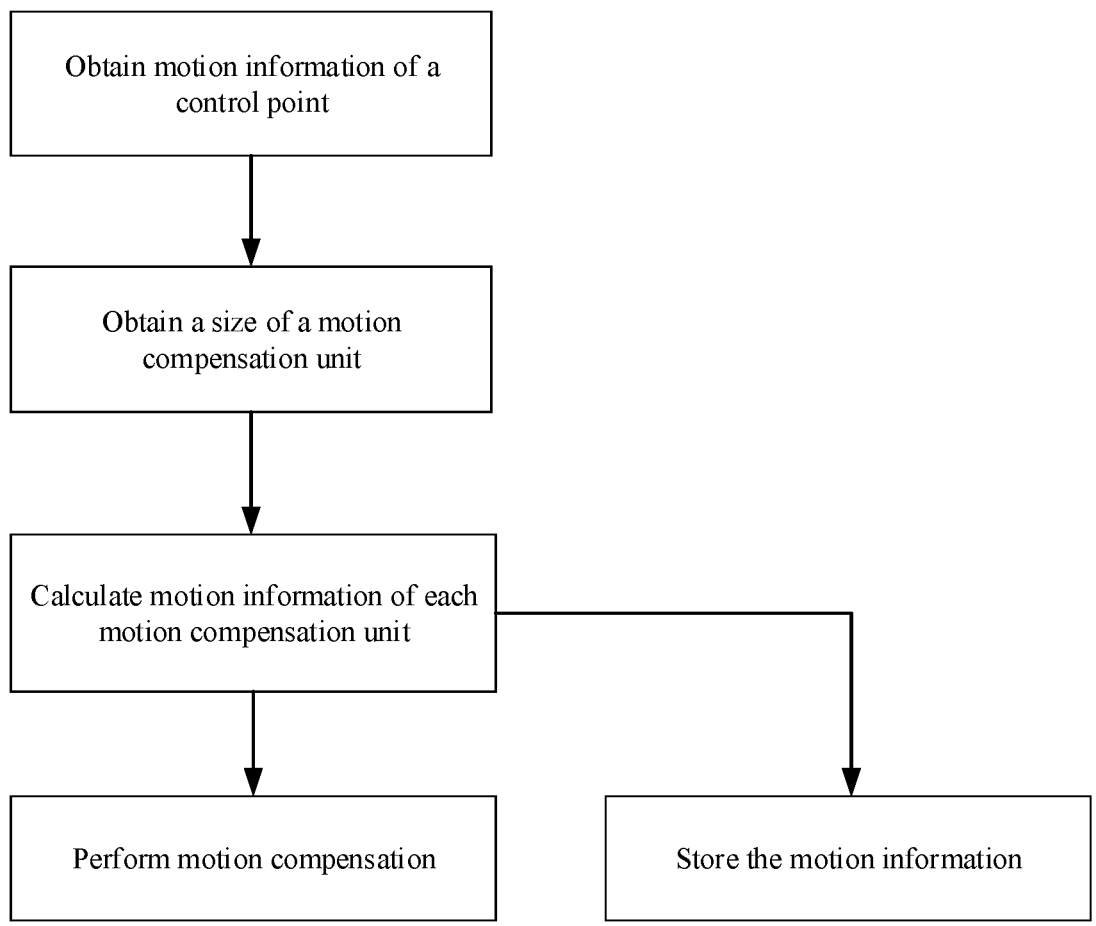
FIG. 9 is a schematic flowchart of another code block prediction method, in accordance with one or more embodiments.

FIG. 9 is a schematic flowchart of a code block prediction method, in accordance with one or more embodiments. The method 900 includes the following steps.

S901. Obtain motion information of a control point of a current affine code block.

An encoder side or a decoder side may obtain the motion information of the control point of the current affine code block based on the foregoing 4-parameter affine transformation model or 6-parameter affine transformation model, or may obtain the motion information of the control point of the current affine code block in another manner. The motion information may include a motion vector of a motion compensation sub-unit in the code block, or may include a motion vector of an image sub-block.

S902. Obtain a size of a motion compensation unit.

The size M×N of the motion compensation unit of the current affine code block may be a size pre-determined by the encoder side or the decoder side. For example, the size may be fixedly set to 4×4 or 8×8, or may be determined based on a motion vector difference between control points, motion vector precision, and a distance between control points.

It should be noted that the size of the motion compensation unit of the affine code block may be determined by using another method. For a specific method, refer to the prior art. Details are not described in this application.

S903. Calculate motion information of each motion compensation unit.

In this step, the motion information of each motion compensation unit in the current affine code block is determined based on the motion information of the control point by using an affine transformation model.

For each motion compensation unit of the current affine code block, motion information (for example, a motion vector) of a pixel at a preset location in the motion compensation unit may be used to represent motion information of all pixels in the motion compensation unit. Assuming that the size of the motion compensation unit is M×N, the pixel at the preset location may be a pixel in a center point (M/2, N/2), an upper left vertex (0, 0), or an upper right vertex (M−1, 0) of the motion compensation unit, or a pixel at another location. A coordinate system of the foregoing coordinates is a plane rectangular coordinate system in which the upper left vertex is an origin, a horizontal direction is an x-axis, and a vertical direction is a y-axis. The following uses a central point of a motion compensation unit as an example for description.

Coordinates of the center point of the motion compensation unit relative to the pixel in the upper left vertex of the current affine code block are calculated by using a formula (10), where i is the $i^{th}$ motion compensation unit (from left to right) in the horizontal direction, j is the $i^{th}$ motion compensation unit (from top to bottom) in the vertical direction, and $(x_{(i,j)}, y_{(i,j)})$ indicates coordinates of a center point of the $(i, j)^{th}$ motion compensation unit relative to the pixel in the upper left vertex of the current affine code block. Then, $(x_{(i,j)}, y_{(i,j)})$ is substituted into a formula (4) to obtain motion information of a center point of each motion compensation unit, and the motion information is used as motion information $((vx_{(i,j)}, vy_{(i,j)}))$ of all pixels in the motion compensation unit.

$$\begin{cases} x_{(i,j)} = M \times i + \dfrac{M}{2}, i = 0, 1 \ldots \\ y_{(i,j)} = N \times j + \dfrac{N}{2}, j = 0, 1 \ldots \end{cases} \quad (10)$$

Optionally, precision of a motion vector directly calculated by using the formula (4) is higher than precision of a motion vector of the control point, and may be further quantized to obtain precision that is the same as the precision of the motion vector of the control point.

Optionally, for a motion compensation unit in which the control point is located, the motion information of the control point is directly set as motion information of the motion compensation unit. If the control point is out of the current affine code block, the motion information of the control point is set as motion information of a motion compensation unit closest to the control point.

Figure 10:
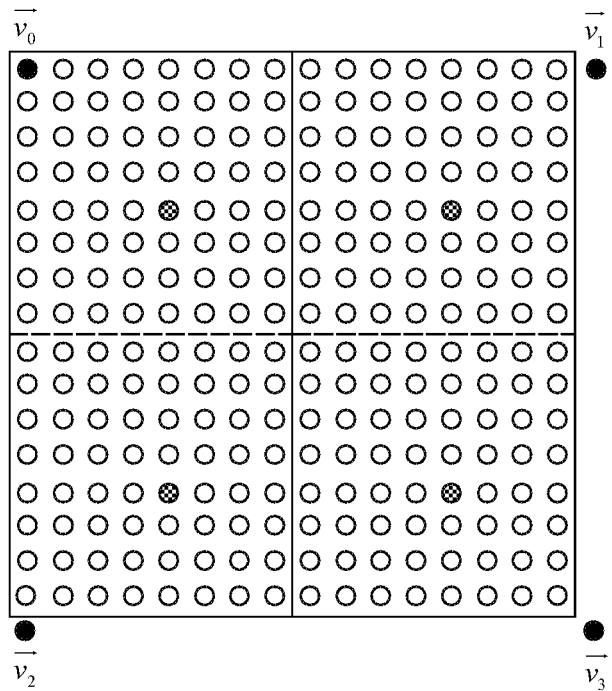
FIG. 10 is a schematic diagram of another affine code block, in accordance with one or more embodiments.

As shown in FIG. 10, in an affine code block with a size of 16×16, a motion compensation unit is 8×8 in size, and a storage unit is also 8×8 in size and overlaps the motion compensation unit. A black solid point is a control point, and a point filled with a slash pattern is a center point of each 8×8 motion compensation unit. Motion information of a control point (0, 0) is set as motion information of a motion compensation unit in an upper left corner. Motion information of a control point (16, 0) is set as motion information of a motion compensation unit in an upper right corner. Motion information of center points corresponding to other motion compensation units is set as motion information of the motion compensation units. For example, motion information of a pixel (4, 12) is set as motion information of a motion compensation unit in a lower left corner, and motion information of a pixel (12, 12) is set as motion information of a motion compensation unit in a lower right corner.

Figure 11:
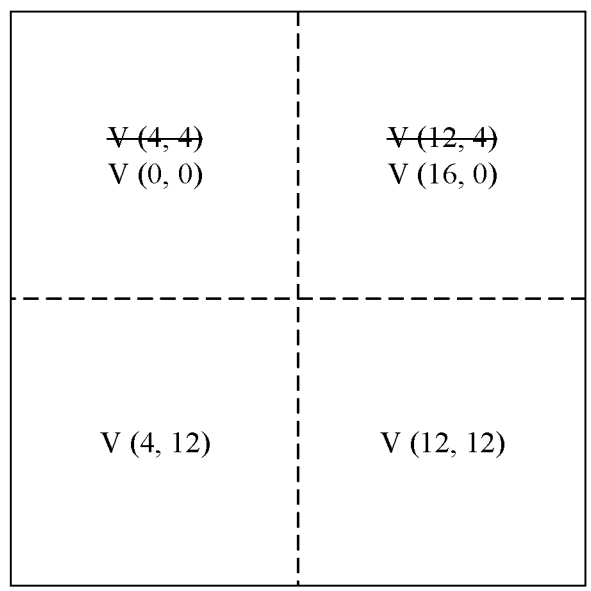
FIG. 11 is a schematic diagram of another motion vector field obtained by using a code block prediction method, in accordance with one or more embodiments.

FIG. 11 shows a motion vector field obtained by using the code block prediction method, in accordance with one or more embodiments. In FIG. 11, V (x, y) indicates a motion vector of a pixel in coordinates (x, y). For example, V (0, 0) indicates a motion vector of a pixel in coordinates (0, 0), and V (4, 12) indicates a motion vector of a pixel in coordinates (4, 12). The pixel in the coordinates (0, 0) is a control point. Because a size and precision of a motion compensation unit are the same as those of a storage unit, a motion vector field of a motion compensation unit shown in FIG. 11 is a motion vector field of a storage unit.

In this embodiment, a motion vector of a control point included in a motion compensation unit is set as a motion vector of the motion compensation unit, and a motion vector of a control point closest to a motion compensation unit in an affine code block is set as a motion vector of the motion compensation unit, so that the motion vector of the control point may be directly stored as a motion vector of the motion compensation unit, without separately storing a motion vector of the motion compensation unit, thereby reducing complexity and memory overheads for storing motion information. Prediction can be performed for the to-be-encoded or to-be-decoded affine code block based on the motion vector of the control point, thereby improving encoding/decoding efficiency.

S904. Perform motion compensation.

For each motion compensation unit of the current affine code block, motion compensation prediction is performed by using the motion information obtained in step S903, to obtain a predictor of each motion compensation unit. Further, a prediction block of the current affine code block is obtained.

S905. Store the motion information.

It should be understood that the foregoing code block is a to-be-encoded block on the encoder side, and the foregoing code block is a to-be-decoded block on the decoder side.

In a subsequent encoding or decoding process, for example, deblocking filtering, overlapped block motion compensation, and deduction of motion information of a subsequent code block, the motion information of the current affine code block is used. Therefore, the motion information of the motion compensation unit obtained in S903 is stored.

When motion vector precision of the motion compensation unit is the same as that of a storage unit, there are three cases as follows:

If the size of the motion compensation unit is the same as that of the storage unit, the motion information (for example, motion information A) of the corresponding motion compensation unit is directly set as motion information of the storage unit.

If the size of the motion compensation unit is greater than that of the storage unit, motion information of each storage unit in the motion compensation unit is set as first motion information. For example, the size of the motion compensation unit is 8×8, and the size of the storage unit is 4×4. In this case, each motion compensation unit includes four storage units, and motion information A is set as motion information of the storage units.

If the size of the motion compensation unit is less than that of the storage unit, motion information of one of a plurality of motion compensation units corresponding to the storage unit may be set as motion information of the storage unit, or motion information of the storage unit may be set to an average value of all motion information of a plurality of motion compensation units corresponding to the storage unit.

When motion vector precision of the motion compensation unit is different from that of a storage unit, one of the following operations may be performed:

Motion information calculated based on the motion vector precision of the motion compensation unit may be first transformed into motion information matching the motion vector precision of the storage unit, and then motion information of the storage unit is determined by using the foregoing method. Alternatively, motion information (for example, motion information B) of the storage unit may be first determined by using the foregoing method, and then the motion information B is transformed into motion information matching the motion vector precision of the storage unit, for storage.

It should be noted that an execution sequence of S905 and S904 may be changed, that is, after the calculated motion information of the motion compensation unit is stored, motion compensation is performed based on the stored motion information.

Figure 12:
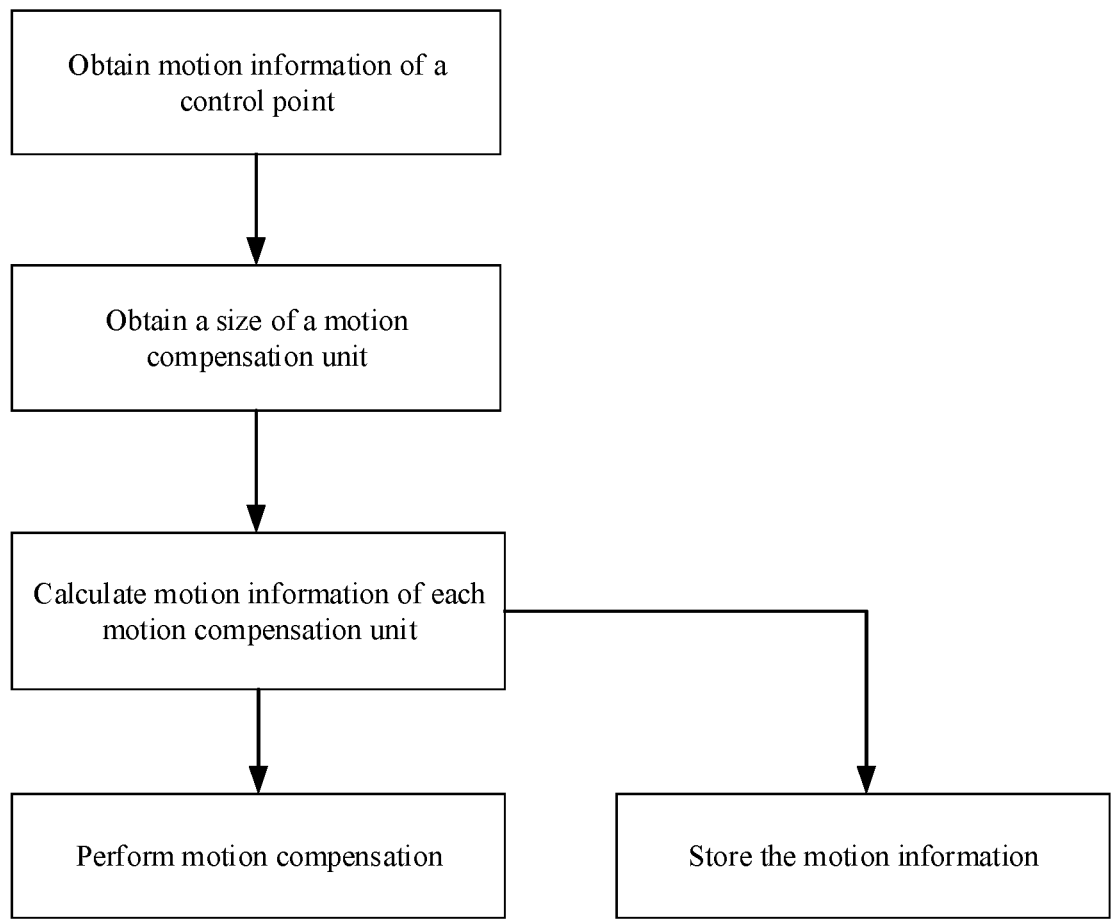
FIG. 12 is a schematic flowchart of still another code block prediction method, in accordance with one or more embodiments.

FIG. 12 is a schematic flowchart of a code block prediction method, in accordance with one or more embodiments. The method 1200 includes the following steps.

S1201. Obtain motion information of a control point of a current affine code block.

An encoder side or a decoder side may obtain the motion information (including a first motion vector) of the control point of the current affine code block based on the foregoing 4-parameter affine transformation model or 6-parameter affine transformation model, or may obtain the motion information of the control point of the current affine code block in another manner. The motion information may include a motion vector of a motion compensation sub-unit in the code block, or may include a motion vector of an image sub-block.

S1202. Obtain a size of a motion compensation unit.

The size M×N of the motion compensation unit of the current affine code block may be a size pre-determined by the encoder side or the decoder side. For example, the size may be fixedly set to 4×4 or 8×8, or may be determined based on a motion vector difference between control points, motion vector precision, and a distance between control points.

It should be noted that the size of the motion compensation unit of the affine code block may be determined by using another method. For a specific method, refer to the prior art. Details are not described in this application.

S1203. Calculate motion information of each motion compensation unit.

In this step, the motion information of each motion compensation unit in the current affine code block is determined based on the motion information of the control point by using an affine transformation model.

For each motion compensation unit of the current affine code block, motion information (for example, a motion vector) of a pixel at a preset location in the motion compensation unit may be used to represent motion information of all pixels in the motion compensation unit. Assuming that the size of the motion compensation unit is M×N, the pixel at the preset location may be a pixel in a center point (M/2, N/2), an upper left vertex (0, 0), or an upper right vertex (M−1, 0) of the motion compensation unit, or a pixel at another location. A coordinate system of the foregoing coordinates is a plane rectangular coordinate system in which the upper left vertex is an origin, a horizontal direction is an x-axis, and a vertical direction is a y-axis. The following uses a central point of a motion compensation unit as an example for description.

Coordinates of the center point of the motion compensation unit relative to the pixel in the upper left vertex of the current affine code block are calculated by using a formula (10), where i is the $i^{th}$ motion compensation unit (from left to right) in the horizontal direction, j is the $j^{th}$ motion compensation unit (from top to bottom) in the vertical direction, and $(x_{(i,j)}, y_{(i,j)})$ indicates coordinates of a center point of the $(i, j)^{th}$ motion compensation unit relative to the pixel in the upper left vertex of the current affine code block. Then, $(x_{(i,j)}, y_{(i,j)})$ is substituted into a formula (4) to obtain motion information of a center point of each motion compensation unit, and the motion information is used as motion information $(vx_{(i,j)}, vy_{(i,j)})$ of all pixels in the motion compensation unit.

$$\begin{cases} x_{(i,j)} = M \times i + \frac{M}{2}, i = 0, 1 \ldots \\ y_{(i,j)} = N \times j + \frac{N}{2}, j = 0, 1 \ldots \end{cases} \quad (10)$$

Optionally, precision of a motion vector directly calculated by using the formula (4) is higher than precision of a motion vector of the control point, and may be further quantized to obtain precision that is the same as the precision of the motion vector of the control point.

Optionally, for a motion compensation unit in which the control point is located, the motion information of the control point is directly set as motion information of the motion compensation unit. If the control point is out of the current affine code block, the motion information of the control point is set as motion information of a motion compensation unit closest to the control point.

Figure 13:
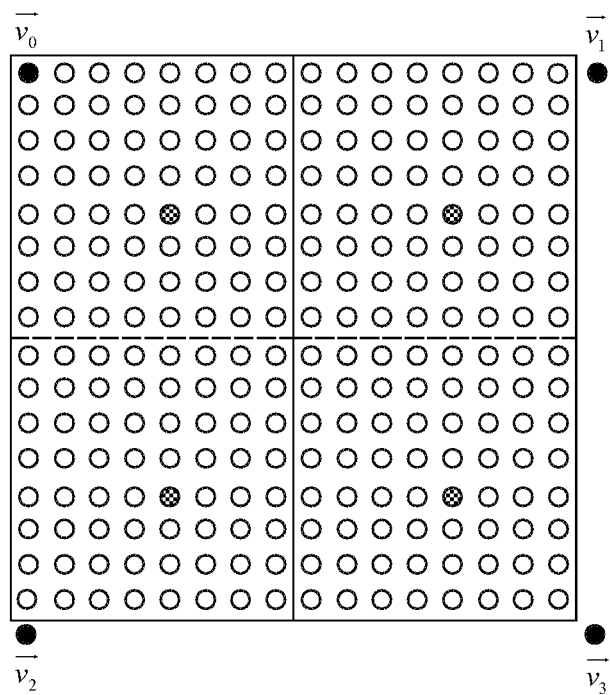
FIG. 13 is a schematic diagram of still another affine code block, in accordance with one or more embodiments.

As shown in FIG. 13, in an affine code block with a size of 16×16, a motion compensation unit is 8×8 in size, and a storage unit is also 8×8 in size and overlaps the motion compensation unit. A black solid point is a control point, and a point filled with a slash pattern is a center point of each 8×8 motion compensation unit. Motion information of a control point included in each motion compensation unit is set as motion information of the motion compensation unit, or motion information of a control point closest to each motion compensation unit is set as motion information of the motion compensation unit. For example, motion information of a control point (0, 0) is set as motion information of a motion compensation unit in an upper left corner, motion information of a control point (16, 0) is set as motion information of a motion compensation unit in an upper right corner, motion information of a control point (0, 16) is set as motion information of a motion compensation unit in a lower left corner, and motion information of a control point (16, 16) is set as motion information of a motion compensation unit in a lower right corner.

Figure 14:
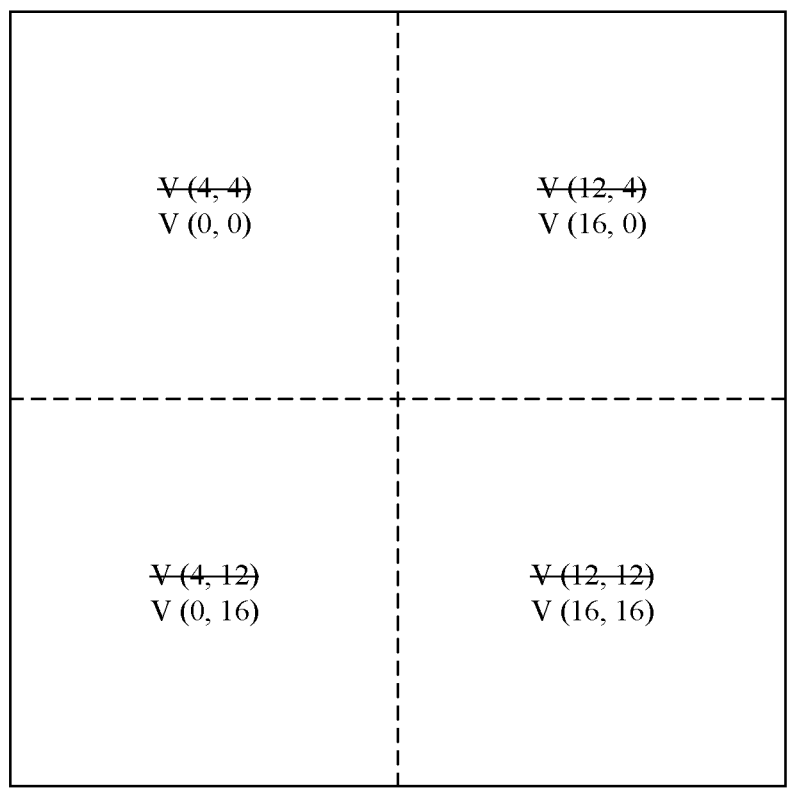
FIG. 14 is a schematic diagram of still another motion vector field obtained by using a code block prediction method, in accordance with one or more embodiments.

FIG. 14 shows a motion vector field obtained by using the code block prediction method, in accordance with one or more embodiments. In FIG. 14, V (x, y) indicates a motion vector of a pixel in coordinates (x, y). For example, V (0, 0) indicates a motion vector of a pixel in coordinates (0, 0), and V (0, 16) indicates a motion vector of a pixel in coordinates (0, 16). The pixel in the coordinates (0, 0) is a control point, and the pixel in the coordinates (0, 16) is also a control point. Because a size and precision of a motion compensation unit are the same as those of a storage unit, a motion vector field of a motion compensation unit shown in FIG. 14 is a motion vector field of a storage unit.

In this embodiment, a motion vector of a control point included in a motion compensation unit is set as a motion vector of the motion compensation unit, and a motion vector of a control point closest to a motion compensation unit in an affine code block is set as a motion vector of the motion compensation unit, so that the motion vector of the control point may be directly stored as a motion vector of the motion compensation unit, without separately storing a motion vector of the motion compensation unit, thereby reducing complexity and memory overheads for storing motion information. Prediction can be performed for the to-be-encoded or to-be-decoded affine code block based on the motion vector of the control point, thereby improving encoding/decoding efficiency. In addition, because motion information of storage units in four corners of the affine code block is motion information of control points, when encoding/decoding processing (for example, motion information prediction) is performed for a subsequent code block based on the affine code block shown in FIG. 14, motion information stored in two storage units in the affine code block that are closest to the subsequent code block may be selected for use. In comparison with the method 900, a reading speed for reading motion information of a storage unit by using the method 1200 is faster, because a reading speed increases as a motion information storage location is closer to a location of the subsequent code block.

The following describes the foregoing beneficial effect by using an example.

Figure 15:
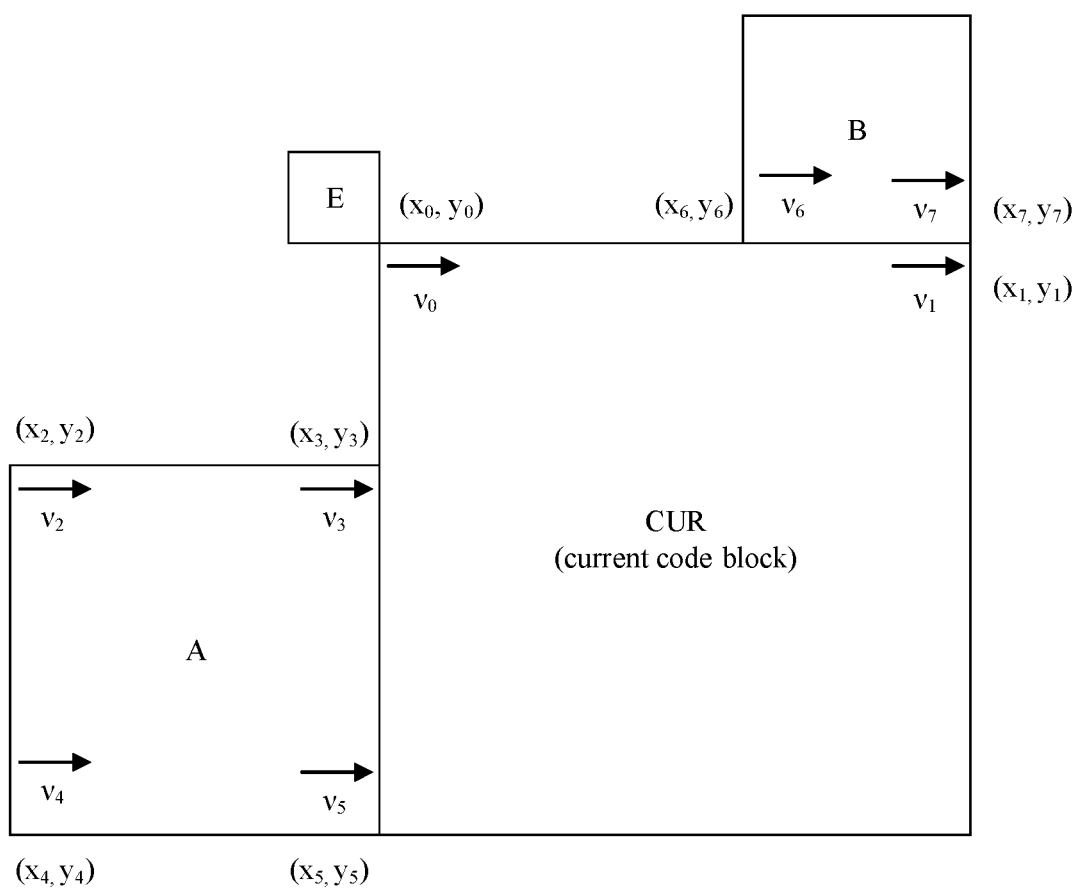
FIG. 15 is a schematic diagram of motion information prediction for a current code block, in accordance with one or more embodiments.

As shown in FIG. 15, a code block A on the left of a current code block is an encoded block. During encoding of the code block A, motion vectors of four control points of the code block A are calculated (in the prior art, motion vectors only of control points in an upper left corner and an upper right corner are calculated): a motion vector $V_2$ ($x_2$, $y_2$), a motion vector $V_3$ ($x_3$, $y_3$), a motion vector $V_4$ ($x_4$, $y_4$), and a motion vector $V_5$ ($x_5$, $y_5$). When motion vector prediction is performed for the current code block, motion vectors of two control points closest to the current code block may be selected: the motion vector $V_3$ and the motion vector $V_5$, so that a motion vector reading speed can be increased (in the prior art, only the motion vector $V_2$ and the motion vector $V_3$ can be selected). A code block B above the current code block is an encoded block. When motion vector prediction is performed for the current code block, motion vectors of two control points closest to the current code block may be selected: a motion vector $V_6$ and a motion vector $V_7$, so that a motion vector reading speed can be increased.

S1204. Perform motion compensation.

For each motion compensation unit of the current affine code block, motion compensation prediction is performed by using the motion information obtained in step S1203, to obtain a predictor of each motion compensation unit. Further, a prediction block of the current affine code block is obtained.

S1205. Store the motion information.

In a subsequent encoding or decoding process, for example, deblocking filtering, overlapped block motion compensation, and deduction of motion information of a subsequent code block, the motion information of the current affine code block is used. Therefore, the motion information of the motion compensation unit obtained in S1203 is stored.

When motion vector precision of the motion compensation unit is the same as that of a storage unit, there are three cases as follows:

If the size of the motion compensation unit is the same as that of the storage unit, the motion information (for example, motion information A) of the corresponding motion compensation unit is directly set as motion information of the storage unit.

If the size of the motion compensation unit is greater than that of the storage unit, motion information of each storage unit in the motion compensation unit is set as first motion information. For example, the size of the motion compensation unit is 8×8, and the size of the storage unit is 4×4. In this case, each motion compensation unit includes four storage units, and motion information A is set as motion information of the storage units.

If the size of the motion compensation unit is less than that of the storage unit, motion information of one of a plurality of motion compensation units corresponding to the storage unit may be set as motion information of the storage unit, or motion information of the storage unit may be set to an average value of all motion information of a plurality of motion compensation units corresponding to the storage unit.

When motion vector precision of the motion compensation unit is different from that of a storage unit, one of the following operations may be performed:

Motion information calculated based on the motion vector precision of the motion compensation unit may be first transformed into motion information matching the motion vector precision of the storage unit, and then motion information of the storage unit is determined by using the foregoing method. Alternatively, motion information (for example, motion information B) of the storage unit may be first determined by using the foregoing method, and then the motion information B is transformed into motion information matching the motion vector precision of the storage unit, for storage.

It should be noted that execution sequences of S1205 and S1204 are interchangeable, that is, the calculated motion information of the motion compensation unit is stored, and then motion compensation is performed based on the stored motion information.

Figure 16:
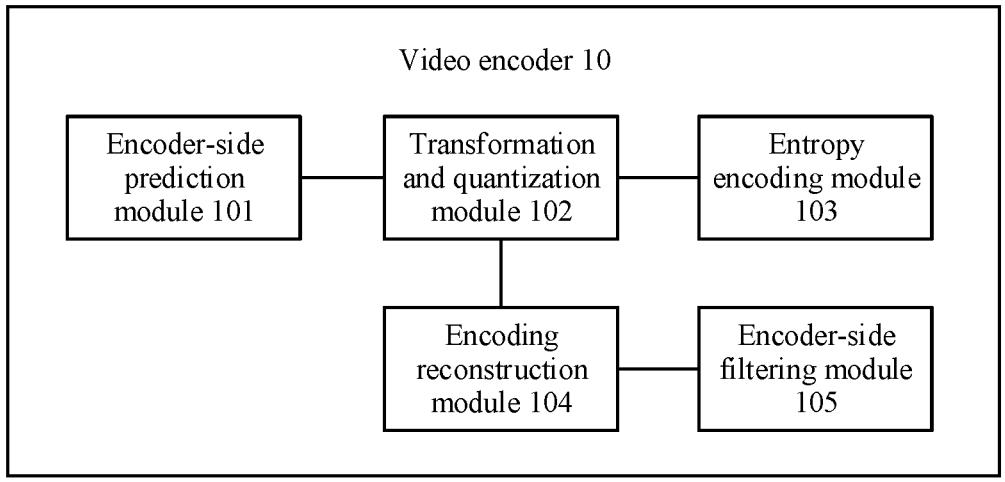
FIG. 16 is a possible schematic structural diagram of a video encoder, in accordance with one or more embodiments.
Figure 17:
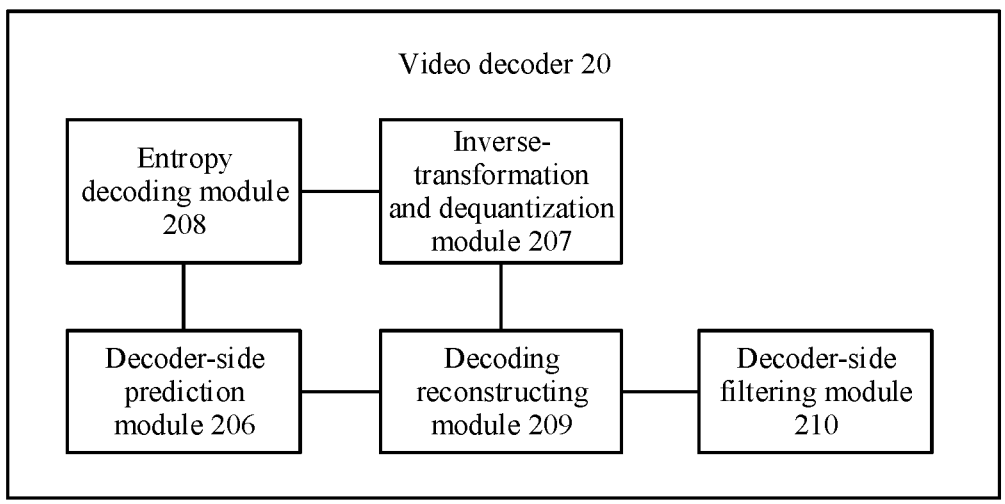
FIG. 17 is a possible schematic structural diagram of a video decoder, in accordance with one or more embodiments.

FIG. 16 is a schematic block diagram of a video encoder 10 for determining a motion vector of an affine code block, in accordance with one or more embodiments. The video encoder 10 includes an encoder-side prediction module 101, a transformation and quantization module 102, an entropy encoding module 103, an encoding reconstruction module 104, and an encoder-side filtering module 105. FIG. 17 is a schematic block diagram of a video decoder 20 for determining a motion vector of an affine code block, in accordance with one or more embodiments. The video decoder 20 includes a decoder-side prediction module 206, an inverse-transformation and dequantization module 207, an entropy decoding module 208, a decoding reconstruction module 209, and a decoder-side filtering module 210. Details are as follows.

The encoder-side prediction module 101 and the decoder-side prediction module 206 are configured to generate predicted data. The video encoder 10 may generate one or more predicting units (PUs) each of which no longer splits a code unit (CU). Each PU of the CU may be associated with different pixel blocks in pixel blocks of the CU. The video encoder 10 may generate a predictive pixel block for each PU of the CU. The video encoder 10 may generate a predictive pixel block for the PU through intra prediction or inter prediction. If the video encoder 10 generates a predictive pixel block for the PU through intra prediction, the video encoder 10 may generate the predictive pixel block for the PU based on a pixel obtained after a picture associated with the PU is decoded. If the video encoder 10 generates a predictive pixel block for the PU through inter prediction, the video encoder 10 may generate the predictive pixel block for the PU based on a pixel or pixels obtained after one or more pictures different from a picture associated with the PU is or are decoded. The video encoder 10 may generate a residual pixel block for the CU based on the predictive pixel block for the PU of the CU. The residual pixel block for the CU may indicate a difference between a sample value of the predictive pixel block for the PU of the CU and a corresponding sample value of an initial pixel block for the CU.

The transformation and quantization module 102 is configured to process predicted residual data. The video encoder 10 may perform recursive quadtree partitioning on the residual pixel block for the CU, to partition the residual pixel block for the CU into one or more smaller residual pixel blocks associated with a transform unit (TU) of the CU. Because each pixel in the pixel block associated with the TU corresponds to one luminance sample and two chrominance samples, each TU may be associated with one luminance residual sample block and two chrominance residual sample blocks. The video encoder 10 may apply one or more transformations to a residual sample block associated with the TU, to generate a coefficient block (that is, a block of coefficients). The transformation may be a DCT transformation or a variant thereof. Two-dimensional transformation is calculated by applying one-dimensional transformation in a horizontal direction and a vertical direction by using a transformation matrix of the DCT, to obtain the coefficient block. The video encoder 10 may execute a quantization program on each coefficient in the coefficient block. Quantization generally means that a coefficient is quantized to reduce a data amount used to represent the coefficient, so as to provide further compression. The inverse-transformation and dequantization module 207 performs an inverse process of a process performed by the transformation and quantization module 102.

The video encoder 10 may generate a set of syntactic elements that represent coefficients in a quantized coefficient block. The video encoder 10 may apply an entropy encoding operation (for example, a context adaptive binary arithmetic coding (CABAC) operation) to some or all of the syntax elements by using the entropy encoding module 103. To apply CABAC encoding to a syntax element, the video encoder 10 may binarize the syntax element to form a binary sequence including one or more bits (referred to as "binary bits"). The video encoder 10 may encode some of the binary bits through regular (regular) encoding, and may encode the other of the binary bits through bypass (bypass) encoding.

In addition to a syntactic element of the entropy-encoding coefficient block, the video encoder 10 may apply inverse quantization and inverse transformation to the transformed coefficient block by using the encoding reconstruction module 104, to reconstruct the residual sample block from the transformed coefficient block. The video encoder 10 may add a residual sample block obtained through reconstruction to a corresponding sample block of one or more predictive sample blocks, to generate a sample block obtained through reconstruction. The video encoder 10 may reconstruct, by reconstructing a sample block of each color component, a pixel block associated with the TU. In this manner, the pixel block for each TU of the CU is reconstructed until the entire pixel block for the CU is reconstructed.

After reconstructing the pixel block for the CU, the video encoder 10 performs a deblocking filtering operation by using the encoder-side filtering module 105, to reduce a blocking effect of the pixel block associated with the CU. After performing a deblocking filtering operation, the video encoder 10 may modify, by using a sampling adaptive offset (SAO), a pixel block that is obtained through reconstruction and that is for a CTB of the picture. After performing these operations, the video encoder 10 may store, in a decoded picture buffer, a pixel block that is obtained through reconstruction and that is for the CU, to generate a predictive pixel block for another CU.

The video decoder 20 may receive a data stream. The data stream includes, in a form of a bistream, encoding information of video data encoded by the video encoder 10. The video decoder 20 parses the data stream by using the entropy decoding module 208, to extract a syntactic element from the data stream. When performing CABAC decoding, the video decoder 20 may perform regular decoding on some binary bits and perform bypass decoding on other binary bits. There is a mapping relationship between a binary bit and a syntactic element of the data stream, and the syntactic element is obtained by decoding the binary bits.

The video decoder 20 may reconstruct a picture of the video data by using the decoding and reconstruction module 209 and based on the syntactic element extracted from the data stream. A process of reconstructing the video data based on the syntactic element is substantially inverse to the process of performing the syntactic element by the video encoder 10 to generate the syntactic element. For example, the video decoder 20 may generate a predictive pixel block for a PU of a CU based on a syntax element associated with the CU. In addition, the video decoder 20 may reversibly quantize a coefficient block associated with a TU of the CU. The video decoder 20 may perform inverse transformation on a coefficient block obtained through inverse quantization, to reconstruct a residual pixel block associated with the TU of the CU. The video decoder 20 may reconstruct a pixel block of the CU based on the predictive pixel block and the residual pixel block.

After reconstructing the pixel block for the CU, the video decoder 20 performs a deblocking filtering operation by using the decoding filtering module 210, to reduce a blocking effect of the pixel block associated with the CU. In addition, based on one or more SAO syntax elements, the video decoder 20 may perform the same SAO operation as the video encoder 10. After performing these operations, the video decoder 20 may store the pixel block of the CU in the decoded picture buffer. The decoded picture buffer may provide a reference picture used for subsequent motion compensation, intra prediction, and presentation of a display apparatus.

The encoder-side prediction module 101 and the decoder-side prediction module 206 are configured to perform corresponding steps in the method 500, the method 600, the method 900, and the method 1200, for example, perform the following steps:

obtaining a first motion vector, where the first motion vector is a motion vector of a first motion compensation unit included in an affine code block;

determining a second motion vector based on the first motion vector, where precision of the second motion vector matches motion vector precision of a storage unit corresponding to the first motion compensation unit; and determining a third motion vector based on the second motion vector, where there is a preset correspondence between the third motion vector and the second motion vector, and the third motion vector is used for subsequent encoding/decoding processing.

It can be clearly learned by persons skilled in the art that, for convenient and brief description, for a specific working process of the foregoing encoder side and decoder side, reference may be made to the corresponding process in the foregoing method embodiments, and details are not described herein again.

After obtaining the first motion vector, the encoder side 10 and the decoder side 20 provided in this application first determine whether precision of the first motion vector matches the motion vector precision of the storage unit, and determines, based on the first motion vector, the second motion vector whose motion vector precision matches the motion vector precision of the storage unit. The obtained second motion vector possibly cannot be directly stored. For example, a size of the first motion compensation unit may be different from that of the storage unit. Therefore, the third motion vector is further determined based on the preset correspondence, and finally, the third motion vector is stored. It can be learned from the foregoing that when storing a motion vector, the encoder side and the decoder side may obtain a motion vector of the storage unit based on the motion vector of the motion compensation unit, without recalculating a motion vector of the storage unit. This reduces encoding/decoding complexity.

In the embodiments of this application, the sequence numbers of the processes do not mean execution sequences. The execution sequences of the processes should be determined based on functions and internal logic of the processes, and should not be construed as any limitation to the implementation processes of this application.

In addition, the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The methods or algorithm steps described with reference to the content disclosed in this application may be implemented by hardware, or may be implemented by a processor by executing a software instruction. The software instruction may include a corresponding software module. The software module may be stored in a random access memory (RAM), a flash memory, a read-only memory (ROM), or an erasable programmable read-only memory (EPROM), an electrically erasable programmable read-only memory (EEPROM), a register, a hard disk, a removable hard disk, a compact disc read-only memory (CD-ROM), or a storage medium in any other form well known in the art. An example storage medium is coupled to a processor, so that the processor can read information from the storage medium and can write information into the storage medium. Certainly, the storage medium may be a component of the processor. The processor and the storage medium may be located in an ASIC. In addition, the ASIC may be located in a terminal device. Certainly, the processor and the storage medium may alternatively exist on the encoder side or the decoder side as discrete components.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, all or some of the procedures or functions according to this application are generated. The computer may be a general-purpose computer, a dedicated computer, a computer network, or another programmable apparatus. The computer instruction may be stored in a computer readable storage medium, or transmitted by using the computer readable storage medium. The computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, wireless, or microwave) manner. The computer readable storage medium may be any usable medium accessible by a computer, or a data storage device such as a server or a data center integrating one or more usable media. The usable medium may be a magnetic medium (for example, a floppy disk, a hard disk, or a magnetic tape), an optical medium (for example, a digital versatile disc (DVD), a semiconductor medium (for example, a solid state disk (SSD)), or the like.

The foregoing specific implementations further describe in detail the objectives, technical solutions, and beneficial effects of this application. It should be understood that the foregoing descriptions are merely example implementations of this application, but are not intended to limit the protection scope of this application. Any modification, equivalent replacement, improvement, or the like made based on the technical solutions of this application is not intended to limit the protection scope of this application, and shall fall within the protection scope of this application.

What is claimed is:

1. A method, comprising:
obtaining a first motion vector of a first motion compensation unit included in an affine code block, the first motion compensation unit being a first motion compensation unit of a plurality of motion compensation units corresponding to a storage unit;

determining a second motion vector based on the first motion vector, where a precision of the second motion vector matches a motion vector precision of the storage unit;

determining a third motion vector based on the second motion vector, where there is a preset correspondence between the third motion vector and the second motion vector, and the third motion vector is used for subsequent encoding/decoding processing; and determining that a size of the storage unit is greater than that of the first motion compensation unit, wherein based on the determination that the size of the storage unit is greater than that of the first motion compensation unit, the preset correspondence facilitates determining a value of the third motion vector as being equal to an average value the second motion vector and a fourth motion vector of a second motion compensation unit of the plurality of motion compensation units corresponding to the storage unit, and the fourth motion vector is a motion vector of a second motion compensation unit of the plurality of motion compensation units corresponding to the storage unit other than the first motion compensation unit.

2. The method according to claim 1, wherein the obtaining of the first motion vector comprises:

determining a motion vector of a control point of the affine code block, where the control point is a reference pixel used for predicting a motion vector of the affine code block; and determining the first motion vector based on the motion vector of the control point, where a value of the first motion vector is equal to that of the motion vector of the control point, and the first motion compensation unit includes the control point, or the affine code block does not include the control point and the first motion compensation unit is a motion compensation unit closest to the control point among the plurality of motion compensation units corresponding to the storage unit.

3. The method according to claim 1, wherein the determining the second motion vector based on the first motion vector comprises:

when a motion vector precision of the first motion compensation unit is the same as that of the storage unit, determining that the value of the second motion vector is equal to that of the first motion vector; and when the motion vector precision of the first motion compensation unit is different from that of the storage unit, determining the second motion vector based on the first motion vector, the motion vector precision of the first motion compensation unit, the motion vector precision of the storage unit, and a motion vector precision transformation formula.

4. The method according to claim 1, wherein the precision of the second motion vector matches the motion vector precision of the storage unit corresponding to the first motion compensation unit based on a determination that a length of a unit distance of a coordinate axis in a coordinate system corresponding to the second motion vector is equal to a length of a unit distance of a coordinate axis in a coordinate system corresponding to the storage unit.

5. The method according to claim 1, wherein subsequent encoding/decoding processing for which the third motion vector is used comprises one or more of deducing motion information of a code block adjacent to the affine code block, loop filtering, or overlapped block motion compensation.

6. An apparatus, comprising:

at least one processor; and a memory having computer readable instructions stored thereon that, when executed by the at least one processor, causes the apparatus to:

obtain a first motion vector of a first motion compensation unit included in an affine code block, the first motion compensation unit being a first motion compensation unit of a plurality of motion compensation units corresponding to a storage unit;

determine a second motion vector based on the first motion vector, where a precision of the second motion vector matches a motion vector precision of the storage unit;

determine a third motion vector based on the second motion vector, where there is a preset correspondence between the third motion vector and the second motion vector, and the third motion vector is used for subsequent encoding/decoding processing; and determine that a size of the storage unit is greater than that of the first motion compensation unit, wherein based on the determination that the size of the storage unit is greater than that of the first motion compensation unit, the preset correspondence facilitates determining a value of the third motion vector as being equal to an average value the second motion vector and a fourth motion vector of a second motion compensation unit of the plurality of motion compensation units corresponding to the storage unit, and the fourth motion vector is a motion vector of a second motion compensation unit of the plurality of motion compensation units corresponding to the storage unit other than the first motion compensation unit.

7. The apparatus according to claim 6, wherein the apparatus is caused to obtain the first motion vector by:

determining a motion vector of a control point of the affine code block, where the control point is a reference pixel used for predicting a motion vector of the affine code block; and determining the first motion vector based on the motion vector of the control point, where a value of the first motion vector is equal to that of the motion vector of the control point, and the first motion compensation unit includes the control point, or the affine code block does not include the control point and the first motion compensation unit is a motion compensation unit closest to the control point among the plurality of motion compensation units corresponding to the storage unit.

8. The apparatus according to claim 7, wherein when a motion vector precision of the first motion compensation unit is the same as that of the storage unit, the value of the second motion vector is determined to be equal to that of the first motion vector, and when the motion vector precision of the first motion compensation unit is different from that of the storage unit, the second motion vector is determined based on the first motion vector, the motion vector precision of the first motion compensation unit, the motion vector precision of the storage unit, and a motion vector precision transformation formula.

9. The apparatus according to claim 8, wherein the precision of the second motion vector matches the motion vector precision of the storage unit based on a determination that a length of a unit distance of a coordinate axis in a coordinate system corresponding to the second motion vector is equal to a length of a unit distance of a coordinate axis in a coordinate system corresponding to the storage unit.

10. The apparatus according to claim 6, wherein
when a motion vector precision of the first motion compensation unit is the same as that of the storage unit, the value of the second motion vector is determined to be equal to that of the first motion vector, and
when the motion vector precision of the first motion compensation unit is different from that of the storage unit, the second motion vector is determined based on the first motion vector, the motion vector precision of the motion compensation unit, the motion vector precision of the storage unit, and a motion vector precision transformation formula.

11. The apparatus according to claim 6, wherein the precision of the second motion vector matches the motion vector precision of the storage unit corresponding to the first motion compensation unit based on a determination that a length of a unit distance of a coordinate axis in a coordinate system corresponding to the second motion vector is equal to a length of a unit distance of a coordinate axis in a coordinate system corresponding to the storage unit.

12. The apparatus according to claim 6, wherein the subsequent encoding/decoding for which the third motion vector is used comprises one or more of deducing motion information of a code block adjacent to the affine code block, loop filtering, or overlapped block motion compensation.

* * * * *

UNITED STATES PATENT AND TRADEMARK OFFICE
CERTIFICATE OF CORRECTION

PATENT NO. : 11,310,524 B2
APPLICATION NO. : 16/858222
DATED : April 19, 2022
INVENTOR(S) : Huanbang Chen It is certified that error appears in the above-identified patent and that said Letters Patent is hereby corrected as shown below:

In the Specification

Column 10, Lines 32-37 should be replaced with the following:
The 6-parameter affine transformation model is shown in a formula (3):

$$\begin{cases} vx = a_1 + a_3 x + a_4 y \\ vy = a_2 + a_5 x + a_6 y \end{cases} \quad (3)$$

Signed and Sealed this
Thirty-first Day of May, 2022

*Katherine Kelly Vidal*

Katherine Kelly Vidal
*Director of the United States Patent and Trademark Office*